United States Patent
Wolfer et al.

(10) Patent No.: US 9,202,100 B2
(45) Date of Patent: Dec. 1, 2015

(54) METHOD AND DEVICE FOR CAPTURING FINGERPRINTS WITH RELIABLY HIGH QUALITY BASED ON FINGERPRINT SCANNERS

(71) Applicant: Cross Match Technologies GmbH, Jena (DE)

(72) Inventors: Roberto Wolfer, Jena (DE); Andreas Bauermeister, Weimar (DE)

(73) Assignee: Cross Match Technologies GmbH, Jena (DE)

( * ) Notice: Subject to any disclaimer, the term of this patent is extended or adjusted under 35 U.S.C. 154(b) by 119 days.

(21) Appl. No.: 14/030,559

(22) Filed: Sep. 18, 2013

(65) Prior Publication Data

US 2014/0079300 A1    Mar. 20, 2014

(30) Foreign Application Priority Data

Sep. 19, 2012 (DE) .................... 10 2012 108 838

(51) Int. Cl.
    *G06K 9/00*              (2006.01)
    *G06K 9/03*              (2006.01)

(52) U.S. Cl.
    CPC .......... *G06K 9/00013* (2013.01); *G06K 9/00912* (2013.01); *G06K 9/036* (2013.01)

(58) Field of Classification Search
    CPC .......... G06K 9/00006; G06K 9/00013; G06K 9/2081
    USPC ........................................... 382/124
    See application file for complete search history.

(56) References Cited

U.S. PATENT DOCUMENTS

| | | |
|---|---|---|
| 5,416,573 A | 5/1995 | Sartor, Jr. |
| 5,828,773 A | 10/1998 | Setlak et al. |

(Continued)

FOREIGN PATENT DOCUMENTS

| | | |
|---|---|---|
| DE | 102006005617 A1 | 8/2007 |
| JP | H10320550 A | 12/1998 |

(Continued)

OTHER PUBLICATIONS

Haiying Guan, Mary F. Theofanos, Yee-Yin Choong, and Brian Stanton,"Real-time Feedback for Usable Fingerprint Systems", IEEE 2011.*

(Continued)

*Primary Examiner* — Nirav G Patel
*Assistant Examiner* — Shaghayegh Azima
(74) *Attorney, Agent, or Firm* — Patentbar International, P.C.

(57) ABSTRACT

A method and a device for capturing fingerprints with reliably high quality based on fingerprint scanners are disclosed. The invention finds a novel possibility for capturing fingerprints of sufficiently high quality in which comprehensible feedback information of the capture process is given in real time so that the user can undertake any needed corrections of finger placement without active guidance. This object is met according to the invention in that an image processing unit is arranged downstream of the capture unit and a two-dimensional display unit is associated with the capture unit. Depending on results of the fingerprints analyzed in the image processing unit, the two-dimensional display unit displays positive real-time depictions of the fingers placed on the capture surface from an image storage having a library comprising a plurality of animated finger position images for guiding the user in a simple manner.

18 Claims, 18 Drawing Sheets

(56) References Cited

U.S. PATENT DOCUMENTS

| | | | |
|---|---|---|---|
| 5,852,670 A | 12/1998 | Setlak | |
| 7,277,562 B2 * | 10/2007 | Zyzdryn | 382/124 |
| 7,319,565 B2 | 1/2008 | Arnold | |
| 2002/0126882 A1 * | 9/2002 | Funahashi | 382/124 |
| 2007/0253605 A1 | 11/2007 | Maurer et al. | |
| 2008/0031495 A1 * | 2/2008 | Saijo et al. | 382/115 |
| 2010/0001831 A1 * | 1/2010 | Takagi | 340/5.82 |
| 2010/0303311 A1 * | 12/2010 | Shin et al. | 382/124 |
| 2012/0069042 A1 * | 3/2012 | Ogita et al. | 345/589 |
| 2012/0106808 A1 * | 5/2012 | Morioka et al. | 382/125 |
| 2012/0127179 A1 * | 5/2012 | Aspelin | 345/441 |
| 2012/0281890 A1 * | 11/2012 | Kamakura et al. | 382/126 |
| 2013/0027184 A1 * | 1/2013 | Endoh | 340/5.83 |

FOREIGN PATENT DOCUMENTS

| | | | |
|---|---|---|---|
| JP | 2003337937 A | 11/2003 | |
| JP | 2004086866 A | 3/2004 | |
| JP | 2005099907 A | 4/2005 | |
| JP | 2006072555 A | 3/2006 | |
| JP | 2008134757 A | 6/2008 | |
| JP | 2009098935 A | 5/2009 | |
| WO | 02/077907 A1 | 10/2002 | |
| WO | 2007123557 A1 | 11/2007 | |

OTHER PUBLICATIONS

Yee-Yin Choong, Mary F. Theofanos, and Haiying G uan, "Fingerprint Self-Captures, Usability of a fingerprint system with real-time feedback",IEEE 2011.*

Guan, H., et al., Real-time feedback for usable fingerprint systems, National Institute of Standards and Technology, 2011.

Theofanos et al., Usability Testing of Ten-Print Fingerprint Capture, NISTIR 7403, Mar. 5, 2007, Department of Commerce, United States of America.

* cited by examiner 3.9  442

3.10

3.11

3.12  441

47

3.13

4.9

4.10

5.9

5.10

5.11

6.11

6.12

7.10

7.11

8.17

8.18

8.19

10.10

10.11

10.12

METHOD AND DEVICE FOR CAPTURING FINGERPRINTS WITH RELIABLY HIGH QUALITY BASED ON FINGERPRINT SCANNERS

RELATED APPLICATIONS

This application claims priority to German Patent Application No. DE 10 2012 108 838.1, filed Sep. 19, 2012, which is incorporated herein by reference in its entirety.

FIELD OF THE INVENTION

The invention is directed to a method and a device for capturing fingerprints with reliably high quality based on fingerprint scanners, particularly fingerprint scanners for civilian applications in which no trained operating personnel are available.

BACKGROUND OF THE INVENTION

In the past, fingerprints were traditionally taken by government law enforcement agencies such as the state's attorney's office, police officials and corrections officials for purposes of registration, identification and verification of suspected persons. Border controls and voter identification are more recent additions to such civilian applications.

Whereas the capture of fingerprints in criminal cases is still supervised and carried out by well-trained, experienced security officials, there are usually no technicians present during the capture and evaluation of fingerprints in civilian applications. Moreover, fingerprinting for civilian purposes is often carried out in high-security areas such as embassies, consulates and specific areas of airports where physical contact between the operator of the capture device and the person being fingerprinted is not permitted. Therefore, the person being fingerprinted must be instructed without the direct attendance of an operator of the capture device.

In order to simplify the fingerprinting process in this regard and to render subsequent evaluation of the quality of the fingerprints more objective, i.e., in order to eliminate subjective visual evaluation, fingerprint scanners were increasingly outfitted with feedback elements. Examples of such feedback elements are acoustic signal outputs (e.g., beepers, loudspeakers), visual displays such as pictograms, LEDs of one or more colors, or location-based displays. Some examples of fingerprint scanners or hand scanners outfitted in this way are the Guardian (manufactured by Cross Match Technologies), RealScan G10 (Suprema), CS500e (Cogent), and MorphoTop (Morpho). With all of these devices, however, it is assumed that the person whose fingerprints are to be taken is either instructed by a device operator or already has experience with a fingerprint scanner, so that the manner in which the fingers are placed is assumed to be correct and only the qualitative results of the individual impressions are displayed and improvements are requested if necessary.

While multicolored LED displays can show whether or not the image quality of a fingerprint is sufficiently good, they cannot provide any assistance as to the conditions which must be changed in order to achieve a sufficient quality of the fingerprints. Further, no instructions can be given as to which fingers are to be placed on the capture surface of the device or where to place the fingers.

Feedback elements for indicating print quality are disclosed, for example, in U.S. Pat. No. 7,277,562 B2, in which the display elements are triggered by evaluating units of the control software. Although the activity of the user is analyzed and results are displayed to demand certain further actions on the part of the user, these display elements are not adequate for guiding the user in an easily understandable manner.

A user guidance study conducted in 2007 by the NIST (National Institute of Standards and Technology, an arm of the U.S. Department of Commerce) confirmed that blinking LEDs were not helpful in the fingerprinting process and in some cases even irritated the user and led to delays in the capture process (Theofanos et al., NISTIR 7403, 2007). In addition, studies showed that video animations were most suitable for guiding users, particularly inexperienced users. However, for safety reasons and due to limited space, monitors capable of showing video instructions of this kind could often not be installed at fingerprinting stations. But even if it were possible to show instructional videos, the user would be compelled to concentrate on the fingerprint scanner for correct placement of fingers and simultaneously on the monitor for video instructions. In most cases, however, video instructions of this kind have no direct link with the actual capture process but are largely continuous loops without real-time feedback for the user with regard to deficiencies in the fingerprint capture.

Present-day local displays on fingerprint scanners or hand scanners help to instruct the user on the fingerprinting process; however, they offer feedback on proper acquisition of the scanned fingerprints only to the operator and not to the person whose fingerprints are being recorded. Examples of hand scanners having local displays of this kind are, e.g., L SCAN 500P (manufactured by Cross Match Technologies), RealScan F (Suprema), MultiScan 1000 (Green Bit) and LS 1100 (Secure Outcome).

The feedback information in local displays of this kind are live images of the fingerprints which are shown in real time as the fingerprints are captured. However, they do not give instructions to the user about how to improve fingerprints of insufficient quality. Further, an untrained user does not know how to position a finger for a usable fingerprint or when a displayed print is good or perfect. This can only be assessed by experienced fingerprint experts.

The live images of recorded fingerprints can also be displayed on the screens of computers which are linked to the fingerprint scanner for controlling. But screens of this kind are usually not visible to the person being fingerprinted or, if so, do not convey any comprehensible feedback to the untrained user about the position and quality of the fingerprint.

In modern fingerprint capture processes for non-criminal applications, i.e., when no official or operator physically carries out or supervises the fingerprinting, three important pieces of information which would allow untrained persons to capture fingerprints are lacking:

a) the correct positioning of the fingers;

b) the need to keep the fingers still during fingerprinting; and c) the correct pressure with which to press the fingers on the capture surface.

Positioning:

The correct position of the fingers on the capture surface is important for ensuring that all fingerprints are completely visible in the final fingerprint image. No fingerprints may be cut off or overlap. In many cases, the fingers are (i) positioned too close together, (ii) spread out beyond the edges of the capture surface, or (iii) not placed in the center of the capture surface so that the fingerprints are not captured in their entirety.

Current fingerprint scanners do not give any feedback on faulty positioning of the fingers as described above, and software-generated arrows superposed on the displayed print image are difficult to comprehend or require more than minimal knowledge about the fingerprinting process. Such comprehension cannot be assumed in the case of persons whose fingerprints are to be recorded for civilian applications.

Holding Fingers Still:

Although the time required for capturing a fingerprint by means of a device with a fingerprint scanner has been significantly reduced in recent years through faster image sensors, it still takes 1 to 3 seconds to capture a set of four fingers. The fingers may not move during this time; otherwise details of the fingerprints (minutiae) will be distorted. At the present time, however, there are no means provided on fingerprint scanners for adequately drawing the attention of the user to this source of errors.

Correct Finger Pressure:

Sufficient contrast is one of the most important prerequisites for the ability to examine, compare and check fingerprints. Contrast in a fingerprint depends upon skin condition (damp/dry, tender/rough/young/old) as well as on the pressure by which the finger is pressed on the capture surface.

Even for trained law enforcement officers, the image quality of a fingerprint image captured by a live scanner (FBI and NIST standard) and displayed on a computer screen is difficult to evaluate by visual assessment. Therefore, in most cases the image quality is analyzed by software algorithms in a step subsequent to the capture of the print. One example of an algorithm of this kind is the algorithm developed by the National Institute of Standards and Technology (NIST) for assessing image quality NFIQ (NIST Fingerprint Image Quality). This NFIQ algorithm assesses fingerprints based on the probability that a sufficiently good comparability with other fingerprints is possible in automatic fingerprint comparison systems (AFIS, or Automatic Fingerprint Identification Systems). In this case, five levels are distinguished, where NFIQ level 1 is the poorest image quality and level 5 is the highest image quality. For operating personnel in civilian applications and particularly for persons whose fingerprints are to be captured, it is completely impossible to visually assess a live scanner fingerprint for evaluation of image quantity.

For live scan devices, as they are called, which are used in government identity management systems (police, passport, personal identification, voter registration, etc.) and which are mostly operated by trained personnel, existing requirements of all kinds regarding the fingers to be acquired (index finger, middle finger, ring finger, little finger, thumb), the quantity of fingers (one finger by itself, two fingers together, four fingers together), type of print (flat, rolled), capture format (e.g., 41×39 mm, 80×75 mm), image resolution (500 ppi or 1000 ppi) and quality parameters of these images (SNR, linearity, geometric distortion, gray value uniformity, MTF) are set very high, and compliance must be demonstrated within the framework of an official approval procedure (the FBI within the United States, the BSI within Germany, the STQC within India and the NPA within Japan). But even for these systems in the course of further commercialization for civilian applications (e.g., tourist traffic, issuing of visas, etc.), application of the invention is desirable and, moreover, leads to a more objective assessment of a fingerprint whose quality is high enough to be approved.

In principle, fingerprints have sufficiently high quality when there is in fact only one matching person determined from a database of several million entries with a very high probability in the automated process. Institutions such as the FBI and the NIST have derived technical parameters from this "top grade" quality which today constitute approval requirements for high-quality fingerprint reading devices.

Nevertheless, assigning a fingerprint to one single person from a prepared database (also a database having fewer entries and when using noncertified equipment) is the criterion for sufficiently high quality for the capture and checking of fingerprints, which means that the fingerprints must be captured in such a way that minutiae thereof are acquired completely and with as little distortion as possible by checking the above-mentioned parameters at least by a quick test.

Steps for improving the capture of fingerprints for reproducible acquisition of high-quality print images are described, for example, in U.S. Pat. Nos. 7,319,565 B2 and 5,416,573 A.

The simplest way to suitably adjust contrast before and during the capture process is to vary the pressing pressure. On the other hand, contrast problems occur in most cases precisely because of too much or too little finger pressure. Too much pressure leads to very dark images and it is no longer possible to separate ridges and valleys of the skin. Conversely, too little pressure leads to low image contrast, and the ridges of skin wrinkles are invisible or only partially visible.

The use of a simple pressure sensor cannot solve this problem satisfactorily because, as was mentioned above, the contrast also depends significantly upon skin condition.

SUMMARY OF THE INVENTION

Therefore, it is the object of the invention to find a novel possibility for capturing fingerprints with sufficiently high quality based on fingerprint scanners in which comprehensible feedback information of the capture process is given in real time so that the user can undertake any needed corrections without relying upon active guidance and support by a trained operator.

In a method for capturing fingerprints with sufficiently high quality based on fingerprint scanners, the above-stated object is met according to the invention through the following steps:

capturing fingerprints of fingers placed upon a capture surface, analyzing the quantity and position of relevant objects of the sensor image, comparing the actual position and actual quantity with reference presets for the position, quantity and type of fingerprints, accessing an image storage with a library comprising a plurality of animated images for a wide assortment of conditions of fingers placed on the capture surface and for the reference presets, and selecting images or series of images representing a deficient placement of fingers corresponding to the object analysis as positive finger depiction, and displaying the selected positive finger depiction in the form of two-dimensional images on a display unit which is positioned in the immediate vicinity of the capture surface.

In an advantageous manner, prints of the first phalanges are searched for as dark pixel areas for analyzing the quantity and position of the fingerprints as relevant objects of the sensor imaging and are provided with circumscribing rectangles whose position is determined with center of mass, surface area and orientation in order to perform a comparison with the reference presets.

The determined deviation from the expected quantity of fingerprints of the reference presets is advisably selected to supplement a corresponding finger depiction from the library of the image storage. In so doing, absent fingers are preferably supplemented by the reference presets and are displayed with deviating patterning, this deviating patterning advisably being selected from different types of borders, shading, fill colors or fill patterns.

In an advantageous embodiment of the method, absent parts of fingerprints resulting from exceeding the margins of the capture surface are displayed by oppositely-directed arrows with knowledge of the rest of the shape of the fingers, and the user is requested to correct position.

Further, additional deviations in the ratio of length to width of the fingerprints detected as object are determined in relation to the reference presets so that oblique positions of the fingers are detected and displayed.

In a further preferred embodiment of the method, absent parts of fingerprints resulting from exceeding the margins of the capture surface are supplemented with knowledge of the rest of the shape of the fingers, and instructions for correction are displayed corresponding to the reference preset by means of a finger outline simulating the finger contour in an enlarged manner.

In a further development of the method, deficient size or deficient contrast of fingerprints resulting from insufficient pressure on the capture surface is determined preferably through analysis of gray value histograms, standard deviation and subsequent threshold evaluation.

In so doing, deficient size or deficient contrast of fingerprints resulting from insufficient pressure on the capture surface can be determined relative to the reference presets and displayed as enlarged finger outline, wherein a patterned region surrounding each fingerprint is displayed depending on the applied pressure as a fingerprint aura which surrounds the finger and which signalizes the optimal pressing pressure on the capture surface when the finger outline is reached.

An incorrect orientation of fingerprints resulting from oblique positioning on the capture surface is advisably determined by analyzing ratios of sides of a circumscribing rectangle and distances from the edge of the capture surface and is displayed by rotating arrows.

In an alternative embodiment, an incorrect orientation of fingerprints resulting from oblique positioning on the capture surface is determined by analyzing ratios of sides of the circumscribing rectangle and distances from the edge of the capture surface, and instructions for correction are displayed by means of a finger outline corresponding to the reference preset, which finger outline simulates the finger contour in an enlarged manner.

In a preferred embodiment of the method, the contrast of the phalanges is additionally determined through analysis of gray value histograms, standard deviation and subsequent threshold evaluation in relation to the reference presets and is displayed as an enlarged finger outline, wherein a patterned region surrounding each fingerprint is displayed, depending on the applied pressure, as a fingerprint aura which surrounds the finger and which signalizes the optimum pressing pressure on the capture surface in the finger outline.

When determining the contrast of the phalanges, the results can be shown on the display as an analog pressure reading in the form of a linear unitless scale which is symmetrical on both sides, wherein too much pressing pressure on the capture surface is signalized by an upward arrow movement along the scale and too little pressing pressure on the capture surface is signalized by a downward arrow movement.

In a further advantageous addition to the method, the immobile position of the fingers is monitored through analysis of distance relationships from the edges of the capture surface over a defined time interval in that positions of the center of mass of the determined fingerprints which are not constant for more than three successive images are displayed as double-displays of the fingers.

In an alternative configuration of the additional monitoring of the immobile position of the fingers through analysis of distance relationships from the edges of the capture surface over a defined time interval, a quantity of concentric arcs are displayed next to the hand display when positions of the center of mass of the determined fingerprints are not constant over more than three successive images.

When monitoring immobile position of the fingers, only changes in the positions of the center of mass of the determined fingerprints moving more than 15 pixels within 750 ms are displayed as motion.

Further, in an arrangement for capturing fingerprints with sufficiently high quality based on fingerprint scanners in which a capture unit for high-resolution fingerprints and an image processing unit arranged downstream for analyzing simple quality criteria are provided for sending only high-quality fingerprints to a database, the above-stated object of the invention is met in that an image storage with a library comprising a plurality of animated finger position images is provided, and in that a two-dimensional display unit which is designed to display the animated finger position images from the image storage depending on results of the fingerprints analyzed in the image processing unit is associated with the capture unit, wherein the display unit is provided for displaying the animated finger position images through positive real-time depictions of the fingers which are actually placed on the capture surface of the capture unit for simple guidance of the user.

The basic idea of the invention consists in that the information about the applied fingers is processed by the image processing unit in such a way that fast and universally intelligible feedback about the applied fingers and correction of placement errors can be carried out. Accordingly, in a preferred manner, no fingerprints are displayed, since they do not allow the inexperienced user to assess the quality of the fingerprint; rather, a fast analysis runs directly in the fingerprint scanner and is animated from a library of images of typical placement error situations stored in an image storage and is preferably displayed as a video sequence.

The invention makes it possible to capture fingerprints and evaluate them with respect to position, quantity, motion and contrast of the fingerprints. This evaluation is converted into information containing feedback intelligible to untrained users about the status of the fingerprint capture process, and requests for any needed corrections and a visual image is provided on a display unit.

BRIEF DESCRIPTION OF THE DRAWINGS

The invention will be described more fully in the following with reference to embodiment examples. The drawings show.

DETAILED DESCRIPTION OF THE PREFERRED EMBODIMENTS

Figure 1:
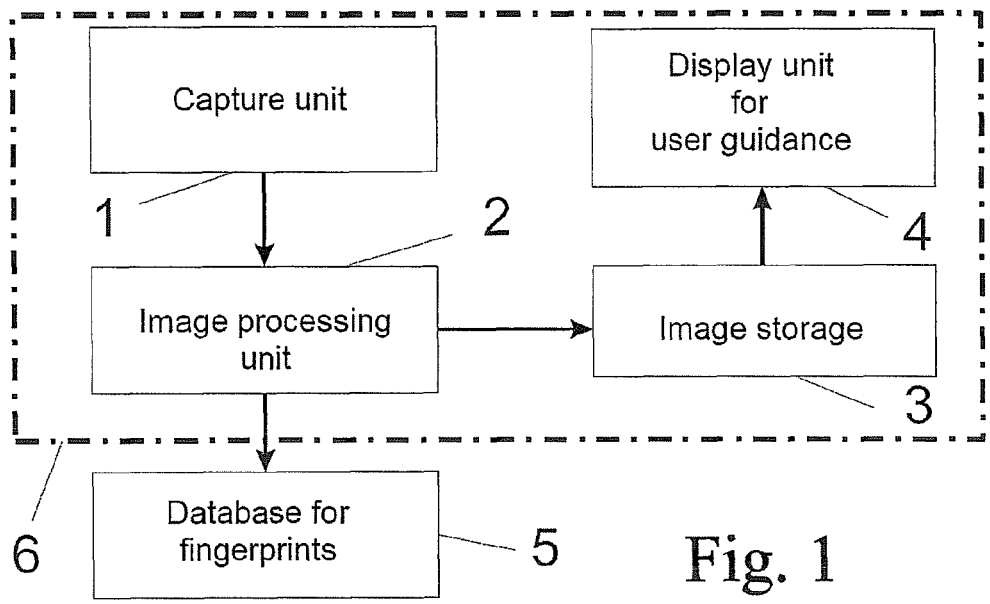
FIG. 1 is a flowchart showing the basic sequence of the method according to the invention with interaction between capture unit, image processing unit, image storage, display unit and database.

According to FIG. 1, the device comprises the following components: a capture unit 1, an image processing unit 2, an image storage 3 and a display unit 4.

It will be appreciated that the capture unit 1 can be configured differently depending on the technology used for capturing the fingerprints 13 and that the invention described herein does not represent any limitation of the capture technology. The image processing unit 2 can either be integrated in the capture unit 1 or accommodated in a separate unit. The display unit 4 is preferably connected directly to the capture unit 1 to allow the closest possible connection between capture and feedback. However, display can also be carried out separately from the capture unit 1. All of the components mentioned above are preferably integrated in a fingerprint scanner 5.

Although the method according to the invention is directed substantially to fast analysis of the captured fingerprints 13 and feedback of the results thereof to an untrained user in order to enhance the quality of the fingerprint capture process and streamline the latter with respect to time, the essential purpose is naturally to enter high-quality fingerprints 13 into a central database 6. This fact is shown in principle in FIG. 1 and FIG. 2 by the connection to a preferably external database 6. The further processing steps required for this are not mentioned in more detail and furthermore are known.

Feedback about the fingerprint capture process can be represented statically as well as dynamically. In dynamic representations, an optional number of steps may be used for representing a parameter. For example, representation of the pressure to be exerted by the fingers 12 until the optimal pressure is reached (see FIGS. 8a-c) can be carried out gradually in ten steps or in only two steps.

The basic mode for capturing four fingers 12 by means of the method and device according to the invention will be described in the following.

Figure 3A:
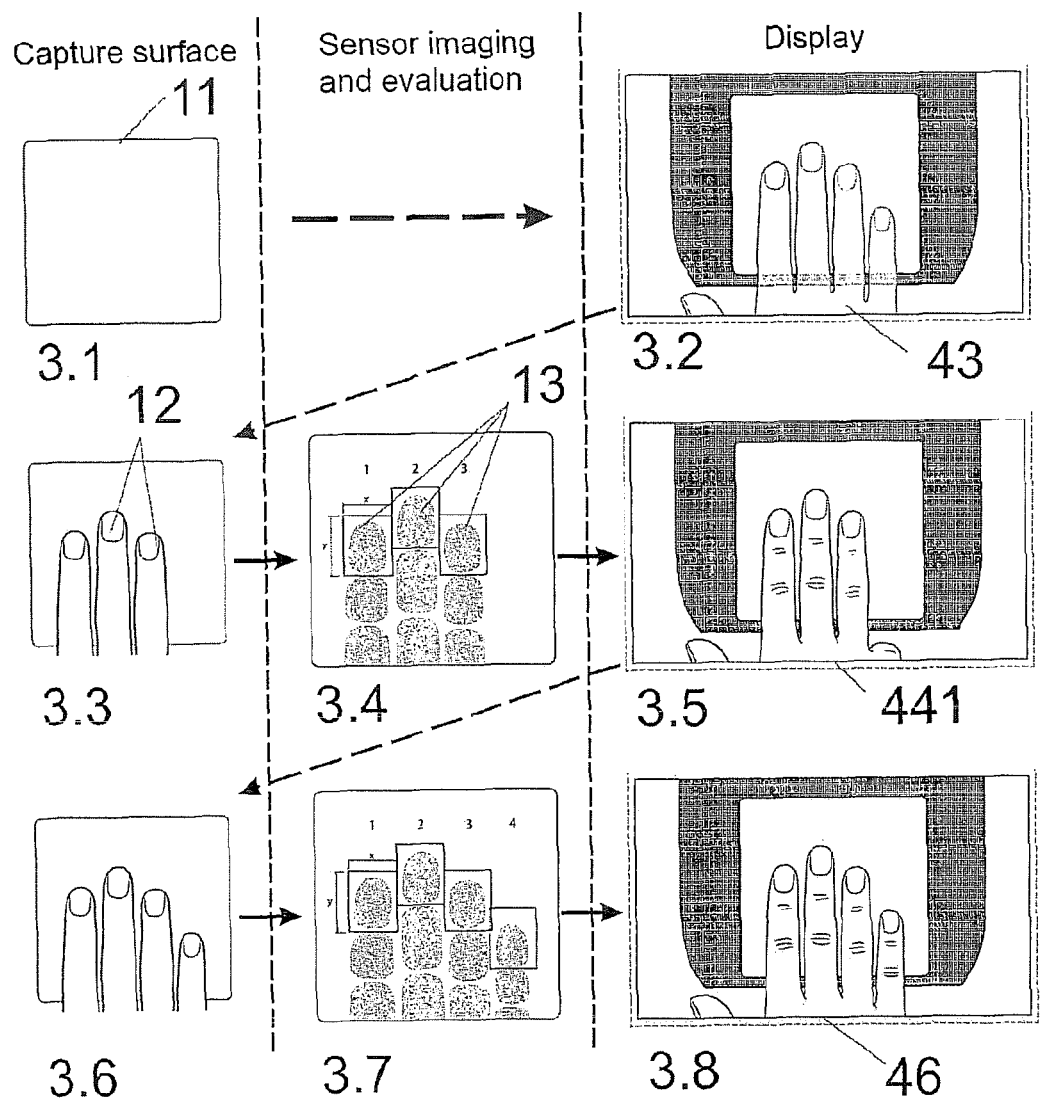
FIGS. 3a and 3b are a schematic illustration of a principle for determining the number of fingers applied to the capture unit and possible graphical user instructions for applying the desired number of fingers.
Figure 3B:
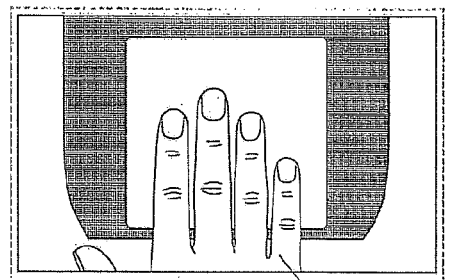
Figure 3B:
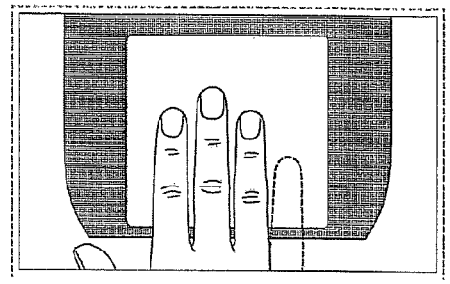
Figure 3B:
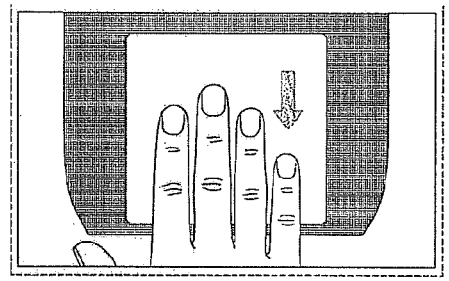
Figure 3B:
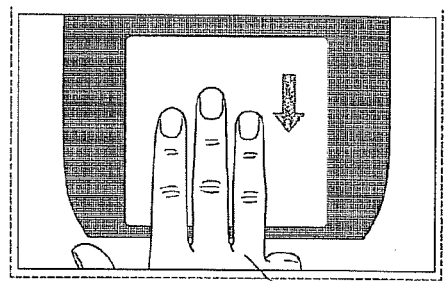
Figure 3B:
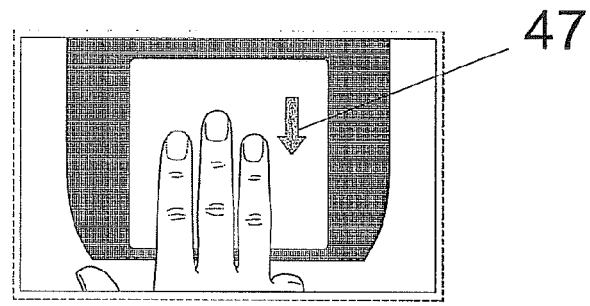
Figure 3B:
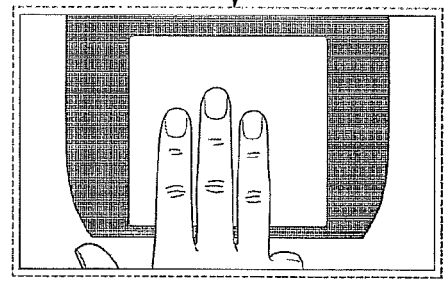

In FIGS. 3a-3b, the user is requested via the display unit 4 to place four fingers 12 of the right hand on the capture surface 11. The user applies four fingers 12, which is confirmed by feedback on the display unit 4. The image processing unit 3 checks the "number of fingers requested" parameter. When the number of applied fingers matches the requested number of fingers, the evaluation proceeds. If there is no match, the absent finger 12 is displayed to the user via the display unit 4.

Figure 8A:
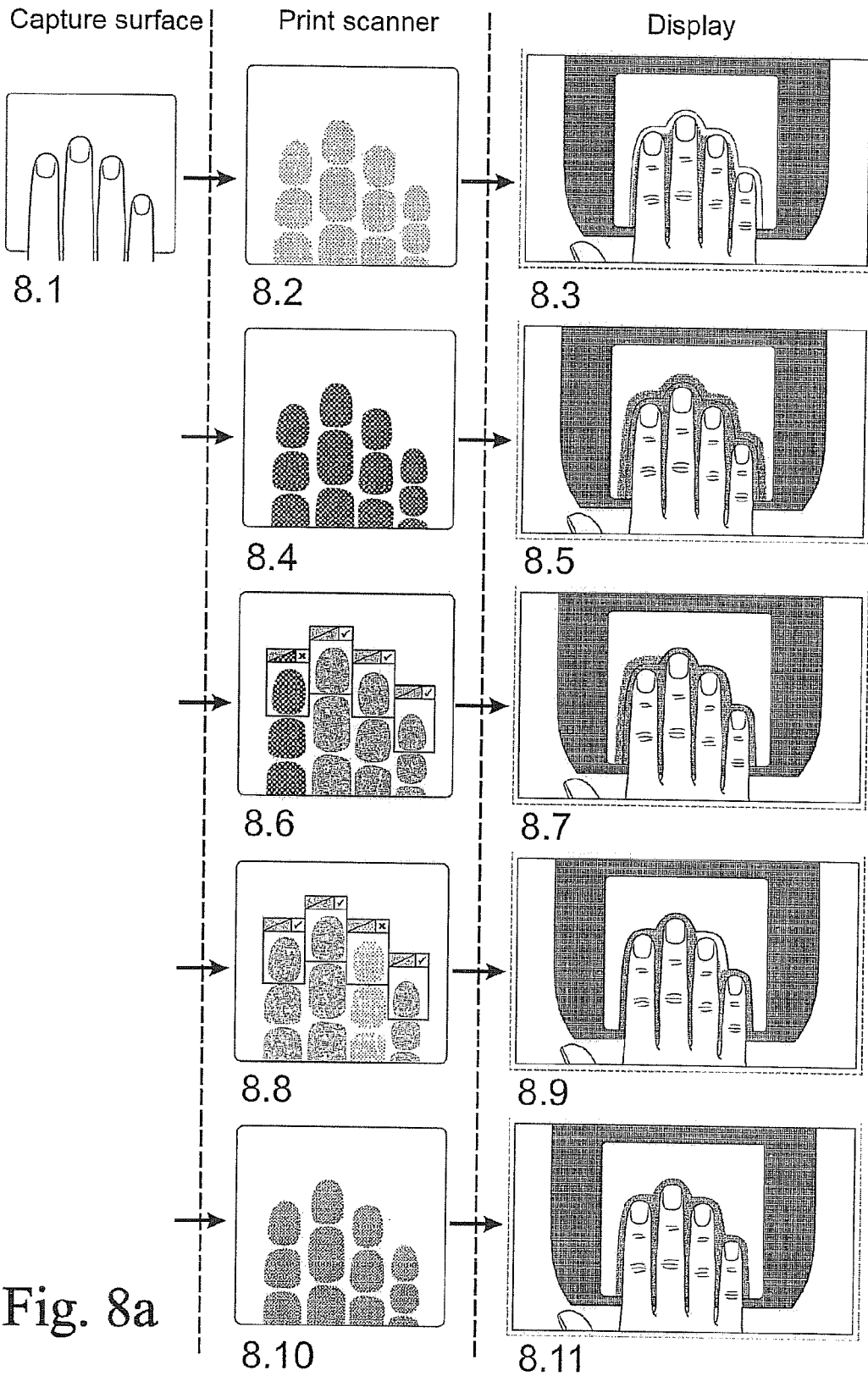
FIGS. 8a, 8b, and 8c are a schematic illustration of a principle for detecting an optimal placement pressure of fingers applied to the capture unit and possible graphical user instructions for adjusting the optimal placement pressure.
Figure 8B:
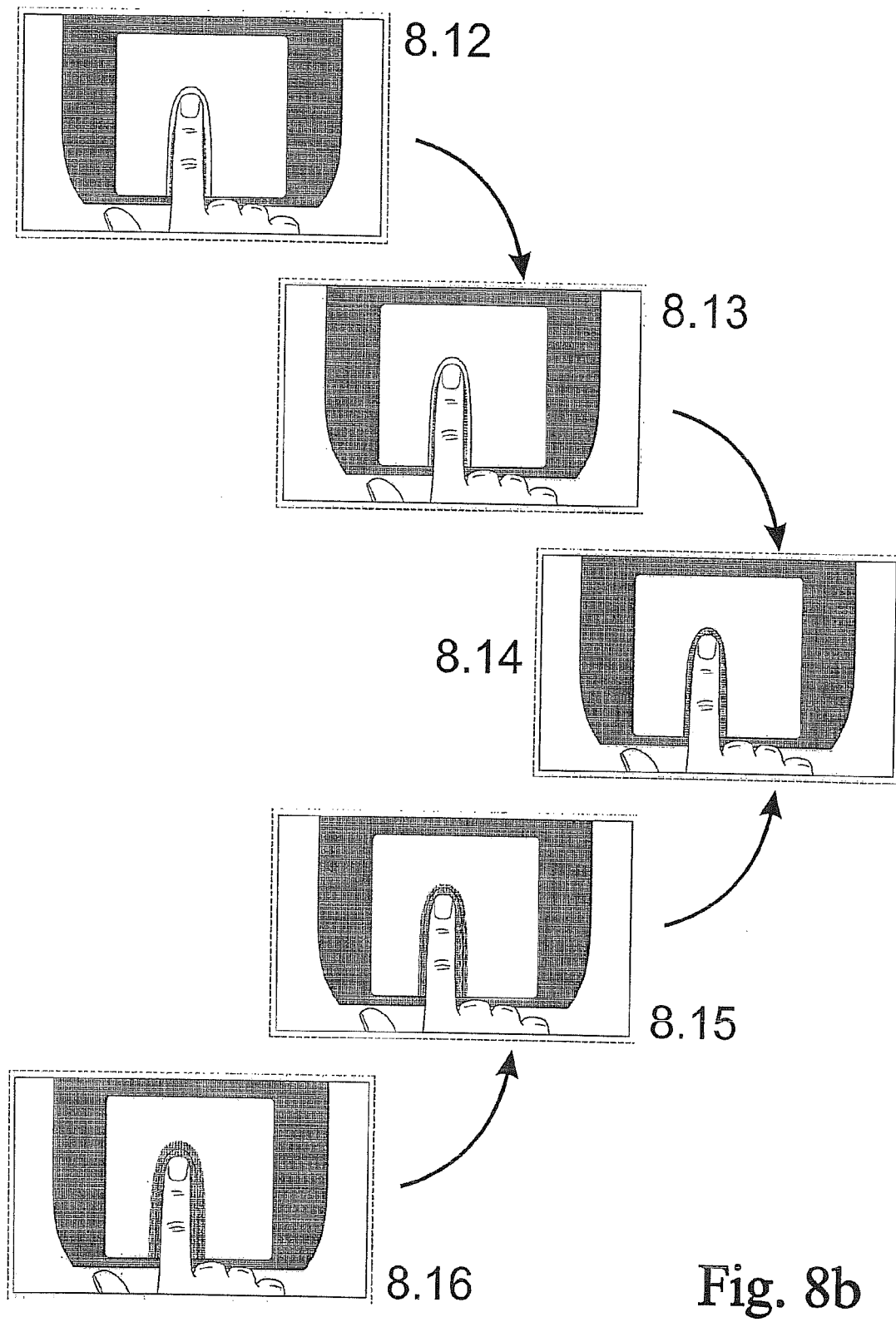
Figure 8C:
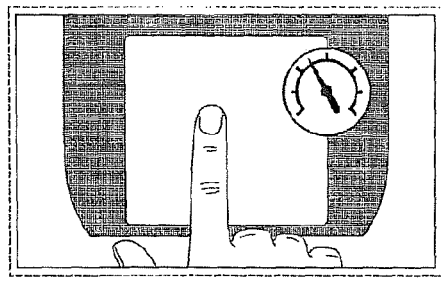
Figure 8C:
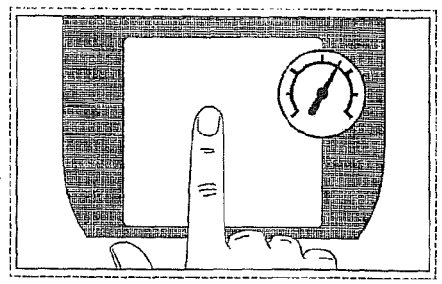
Figure 8C:
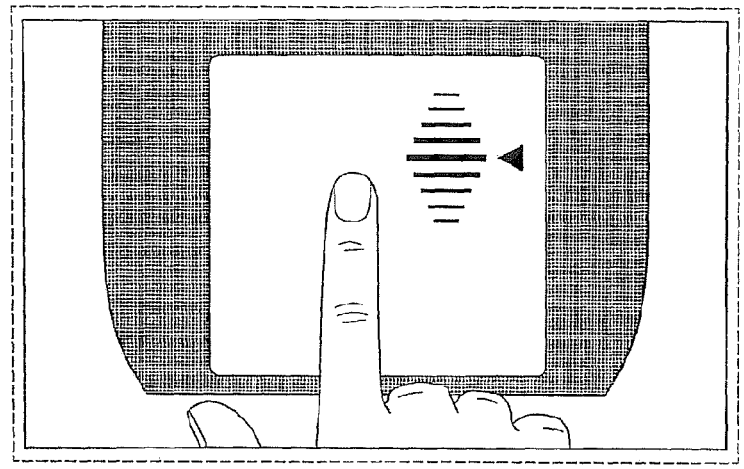
Figure 9A:
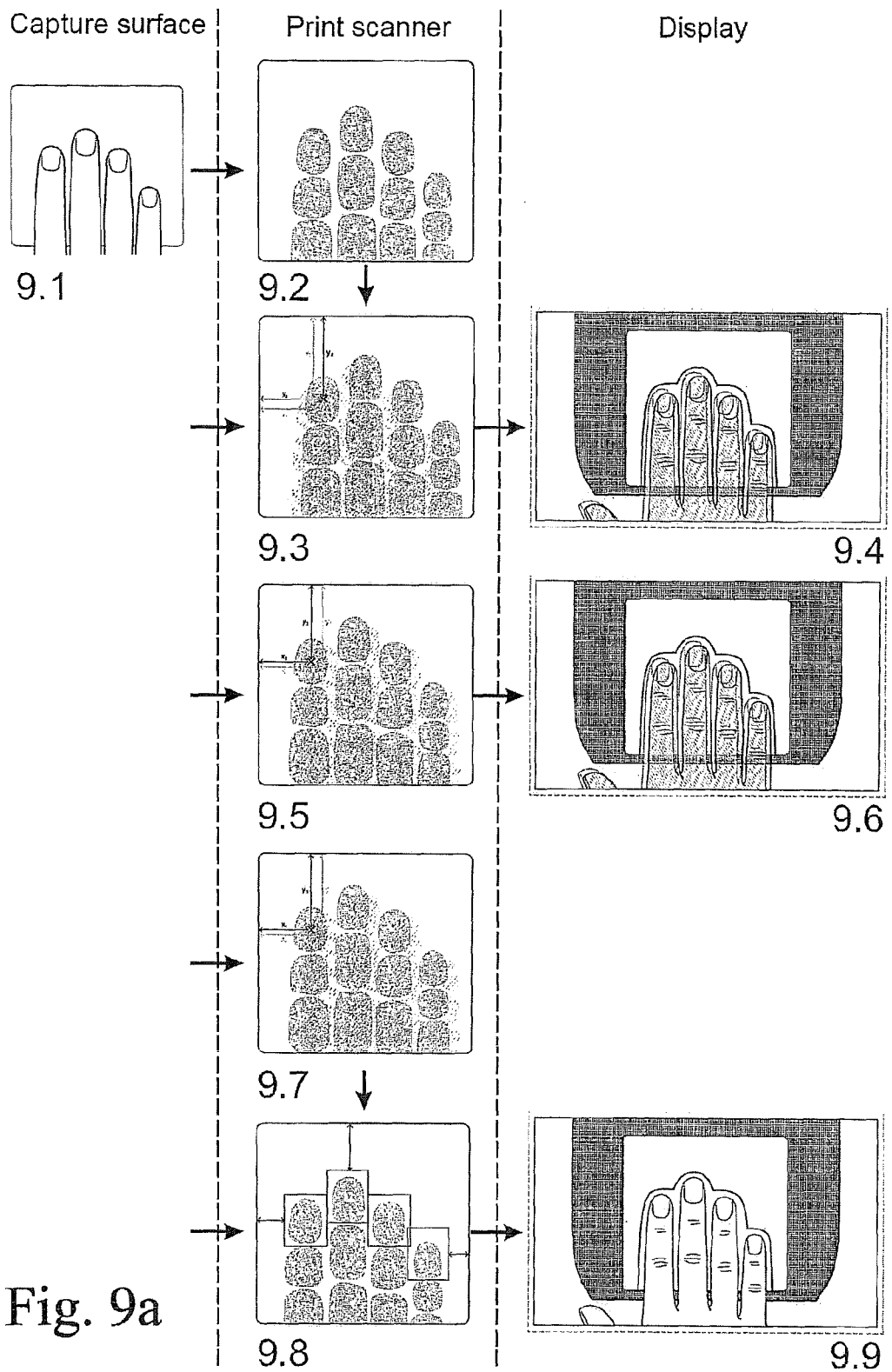
FIGS. 9a and 9b are a schematic illustration of a principle for detecting fingers which are applied unsteadily to the capture unit and possible graphical user instructions for steady placement of the fingers.
Figure 9B:
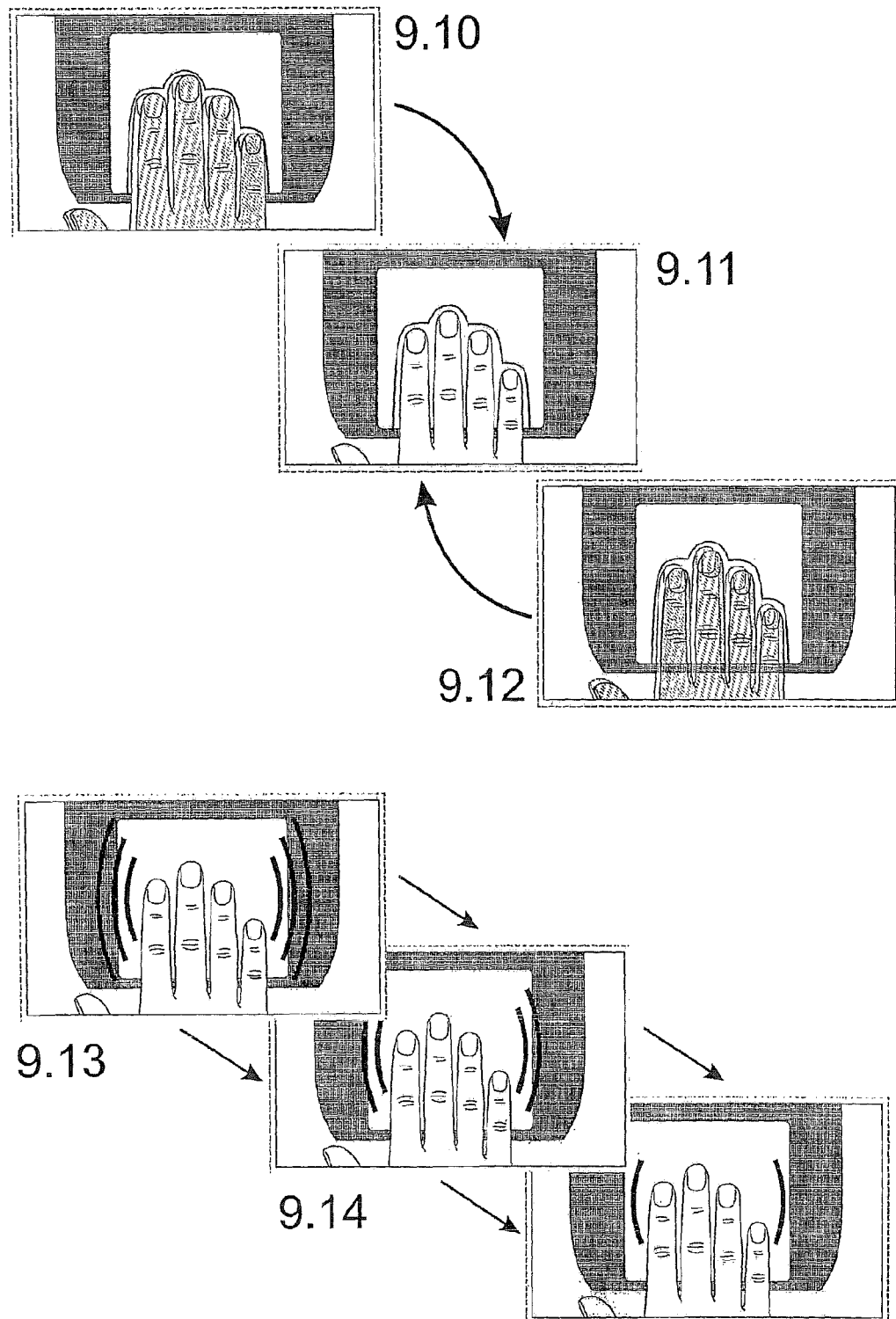

In the subsequent steps, the image processing unit 2 checks whether or not the position of the fingers 12 is correct (FIGS. 4a-b, 5a-b and 6a-b). In case it is not correct, the incorrect position is displayed to the user. If the position of the applied fingers 12 is correct, the image processing unit 2 goes on to check the immobile position of the fingers 12 on the capture unit 1 (FIGS. 9a-b). If the fingers 12 move, this is indicated to the user by the display unit 4. In the next step, the contrast of the applied fingers 12 is checked by the image processing unit 2 (FIGS. 8a-c). If there is sufficient contrast and, therefore, an acceptable quality of the fingerprint 13, the fingerprints 13 are captured by the capture unit 1, the successful conclusion of the capture is indicated to the user and is sent to a database 6 for central storage. Alternatively, the fingerprints 13 can be compared with fingerprints which are already stored in the database 6.

If the contrast of the applied fingers 12 is too low, the user is informed that more pressure must be exerted on the applied fingers 12 to achieve a sufficient contrast. If the contrast of the applied fingers 12 is too high, the display unit 4 instructs the user to reduce the pressure of the fingers 12 on the capture surface 11.

The fingerprints 13 are detected by the capture unit 1 as soon as they contact the capture surface 11. The capture unit 1 comprises, for example, an optical system having the capture surface 11, a camera with an objective (not shown) and an image sensor (only the output image is shown). The evaluation of the fingerprints 13 with respect to position, quantity, contrast and motion is carried out by the image processing unit 2. The user is informed of the results of this evaluation in a comprehensible manner in real time via the display unit 4. Feedback is preferably carried out via graphical elements. This ensures a universally understandable feedback about the success or failure of the procedure without reliance on language or education. Predefined images (templates of typical placement errors of the fingers 12) are stored in the image storage 3 and are displayed on the display unit 4 depending on feedback from the image processing unit 2. The image storage 3 can be integrated in the fingerprint scanner 5, as is shown in FIG. 1, as well as in a connected external computer. For convenience in the description and without limiting generality, it is assumed that the image storage 3 is integrated in the fingerprint scanner 5. These stored images contain all possible conditions for meeting or not meeting the target value. For example, images relating to the correct number of fingers 12, correct exertion of pressure of the fingers 12 or the correct position of the fingers 12 are stored therein. Likewise, images relating to deficient pressure, incorrect position or absent fingers 12, for example, are stored in the image storage 3. It will be appreciated that within the meaning of the invention the quantity and composition of the images are not limited by the cases described herein and that individual fingers or a plurality of fingers 12 in an image and images of rolled and flat fingers can be stored. It will also be appreciated that it lies within the scope of the invention that a multiple-finger image can be generated dynamically from images of individual fingers.

Figure 2:
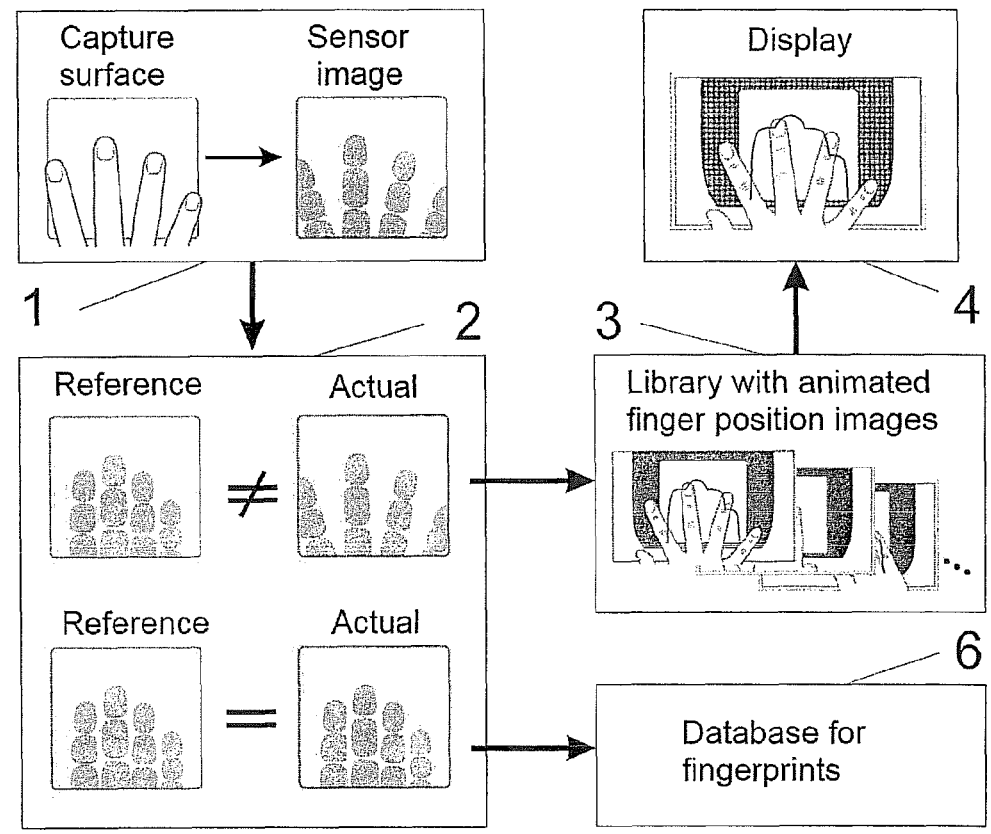
FIG. 2 is a schematic illustration of an example for the interaction between the capture unit, image processing unit, image storage and display unit.

FIG. 1 shows the basic interaction between the components of the device. The fingers 12 are placed on the capture surface 11 of the capture unit 1. The applied objects are acquired by the sensor of the capture unit 1 and this information is sent to the image processing unit 2. The image processing unit 2 analyzes the obtained information and compares previously determined parameters (e.g., gray values, size, position) to the parameters actually generated by the applied fingers 12. The results of the analysis can consist either in a match between the requested target value of the determined parameters and actual parameters or in a deviation between them. Depending on whether the results show a match or a deviation, the appropriate image from the image storage 3 pertaining to a match with or a deviation from the target state is displayed via the display unit 4 by means of the image processing unit 2. FIG. 2 shows this process, for example, for the case in which the fingers 12 to be applied are placed in an incorrect position. It is assumed that the four fingers 12 of the right hand are to be captured. The four fingers 12 are located on the capture unit 1. However, two of the four fingers 12 are placed beyond the borders of the capture surface 11. Accordingly, the sensor scan detects two correctly placed fingers 12 and two incorrectly placed fingers 12. This information is evaluated by the image processing unit 2 and, in view of the fact that the target state has not been met in this instance, the corresponding image showing the fingers 12 extending beyond the capture surface 11 is displayed.

Embodiment Examples

First Parameter: Number of Fingers Requested

FIG. 3a shows how the user is requested via the display unit 4 by means of a suitable representation of a (stylized, computer-drawn or photograph-like) hand to apply the four fingers 12 of the right hand (illustration 3.2) based on a detection of the fingers 12 applied to the capture surface 11 (left-hand column of illustrations 3.1, 3.3, 3.6) and on an analysis of the sensor images (middle column of illustrations 3.4, 3.7) of the fingerprint scanner 5. The request to apply four fingers 12 is displayed by depicting four semi-transparent fingers (ghost hand 43, in this case the right hand) on the display unit 4. At this time, there are still no fingers 12 on the capture surface 11 of the capture unit 1 (illustration 3.1).

It is assumed that the user has not applied all fingers 12. In illustration 3.3, only three fingers 12 are applied instead of four. The three fingers 12 are detected as objects by the image processing unit 2 by analyzing the gray values and size of the applied objects (as is described, for example, in U.S. Pat. No. 7,277,562 B2). For each image supplied by the sensor, a contrast is determined automatically before segmentation of the individual fingerprints 13, the standard deviation of the total image of the sensor scan being determined in a simple manner for the contrast and compared with a threshold value (e.g., 10). If the threshold value has been exceeded 22, the segmentation of fingerprints 13 required for determining the number of applied fingers 12 commences. To this end, the dark pixels grouped together in pixel groups (clouds) are taken together and provided with a circumscribing rectangle 14 which intersects or touches at least one edge pixel of the cloud in each instance.

Illustration 3.4 shows the three fingerprints 13 detected by the sensor scan of the capture unit 1 with schematically depicted analysis steps carried out in the image processing unit 12. In this case, each finger 12, as object (defined as the distal phalange and searched for as such in the digital image), must achieve a minimum of gray values and/or a minimum surface area (two-dimensional size). For this purpose, a circumscribing rectangle 14 (bounding box) is defined around the object and is subtended by the outermost pixels parallel to the side edges of the capture surface 11. In addition, the orientation of the object is determined by calculating a principal axis of inertia (through the object pixel cloud) along which the object extension in perpendicular direction of the sensor image is determined as quantity of pixels and as length. If the axis of inertia is inclined by less than a tolerance (e.g.,) 3°, the Y dimension is determined. Otherwise, the object (pixel cloud) must be calculated by "rotating back" to parallelism relative to the side edges of the capture surface 11 and the circumscribing rectangle 14 must be modified to determine the true Y dimension. Analogous steps must then also be carried out for the orthogonal X dimension in order to calculate the X dimension therefrom and to compare the size of the object dimension determined in this way with a length/width threshold value for a minimum print (e.g., 15 mm/8 mm). If the length and width threshold is exceeded, the fingerprint 13 is accepted as such and declared as having a "good shape"; otherwise, it is rejected as having a "bad shape".

For each applied finger 12, the actually measured gray value and/or the surface area are/is compared with predefined gray values/surface areas. When this minimum is met or exceeded, the finger 12 is detected as such and is counted (quantity) and the fingers 12 which have thus far been displayed transparently on the display unit 4 are displayed in color.

With respect to the finger 12 that is not applied, a previously defined minimum quantity of gray values and/or a previously defined area size are/is not met. The information about the insufficient gray values and/or insufficient surface area of an expected object is sent by the image processing unit 2 to the display unit 4 as information about an absent finger 12. The display unit 4 which displays a stylized device surface 41 and a stylized capture surface 42 interprets this information and represents the absent finger 12 in a first depiction as a hand with missing finger 441 (illustration 3.5).

In FIG. 3b, illustrations 3.9 to 3.13 show alternative depictions of the absent fourth finger 12. In this case, the absent finger 12 is displayed on the display unit 4 in a different color as a hand with a differently colored finger 442 or as a hand with a finger 443 in dashed lines. For the hand with differently colored finger 442, illustration 3.9 merely shows the absent fourth finger 12 as grayed out (gray fill); in illustration 3.10 the absent fourth finger 12 is shown only as an outline (hand with finger 443 in dashed lines).

Illustrations 3.11 and 3.12 in FIG. 3b show alternative pictures for requesting the user to present the absent fourth finger 12 in which the absent finger 12 or the displayed finger 12 (shown in the same color or a different color next to the other fingers 12) is indicated by an arrow 47.

In another configuration according to illustration 3.13, the absent finger 12 can also be indicated in an alternating manner (displayed/not displayed). In other modifications, the absent finger 12 can also be represented in a blinking manner outlined in dashes or in a different color than the present fingers 12, or the arrow 47 in illustrations 3.11 or 3.12 can be superposed on the display unit 4 as a blinking (alternately displayed) arrow 47 to emphasize the request.

The images for indicating that a desired parameter (the correct number of applied fingers 12 in the examples described above) has been met or not met are predefined for all finger placement situations for fingers 12 and are stored in the image storage 3. At least one separate image (correct finger placement) is stored for each placement situation. Further, images are stored for every conceivable deficient positioning of fingers 12 of both hands, and additional intermediate images for displaying a video animation for correcting finger placement are stored in case it is desirable to show a motion video between incorrect placement and correct placement.

Once the user has placed the absent fourth finger 12 on the capture surface 11 of the capture unit 1 (FIG. 3a, illustration 3.6) and this fourth finger 12 is detected (illustration 3.7) by the sensor scan at position No. 4 in addition to the three fingers 12 which have already been detected, the gray values and/or object sizes are/is compared again with the minimum threshold values for all four fingers 12, and the fourth finger 12 is also shown as finger (of same color) on the stylized capture surface 42 (illustration 3.8) when these threshold values are met or exceeded. Once all four fingers are shown in color as present, the "requested number of fingers" parameter is considered to be met and the image for the correct number of applied fingers 12 is sent to the display unit 4 from the image storage 3 by the image processing unit 2. In addition, the absent finger 12 can also be indicated by text-based information.

Second Parameter: Correct Position of the Fingers

The image processing unit 2 only analyzes defined objects (first phalanges) of applied fingers 12 corresponding to the position thereof relative to the edge of the capture surface 11. The gray values and surface areas of the detected objects are determined for this purpose. It is assumed that all of the objects are found through analysis of the gray values and size of the capture surface 11. If the objects found in this way are not at a predefined minimum distance from the horizontal and vertical edges of the capture surface 11 or even extend beyond these edges, this information is conveyed to the user by the image processing unit 2 via the display unit 4 in a manner analogous to that described for the first example (assignment of the images for the detected finger placement situation which are stored in the image storage 3).

Figure 4A:
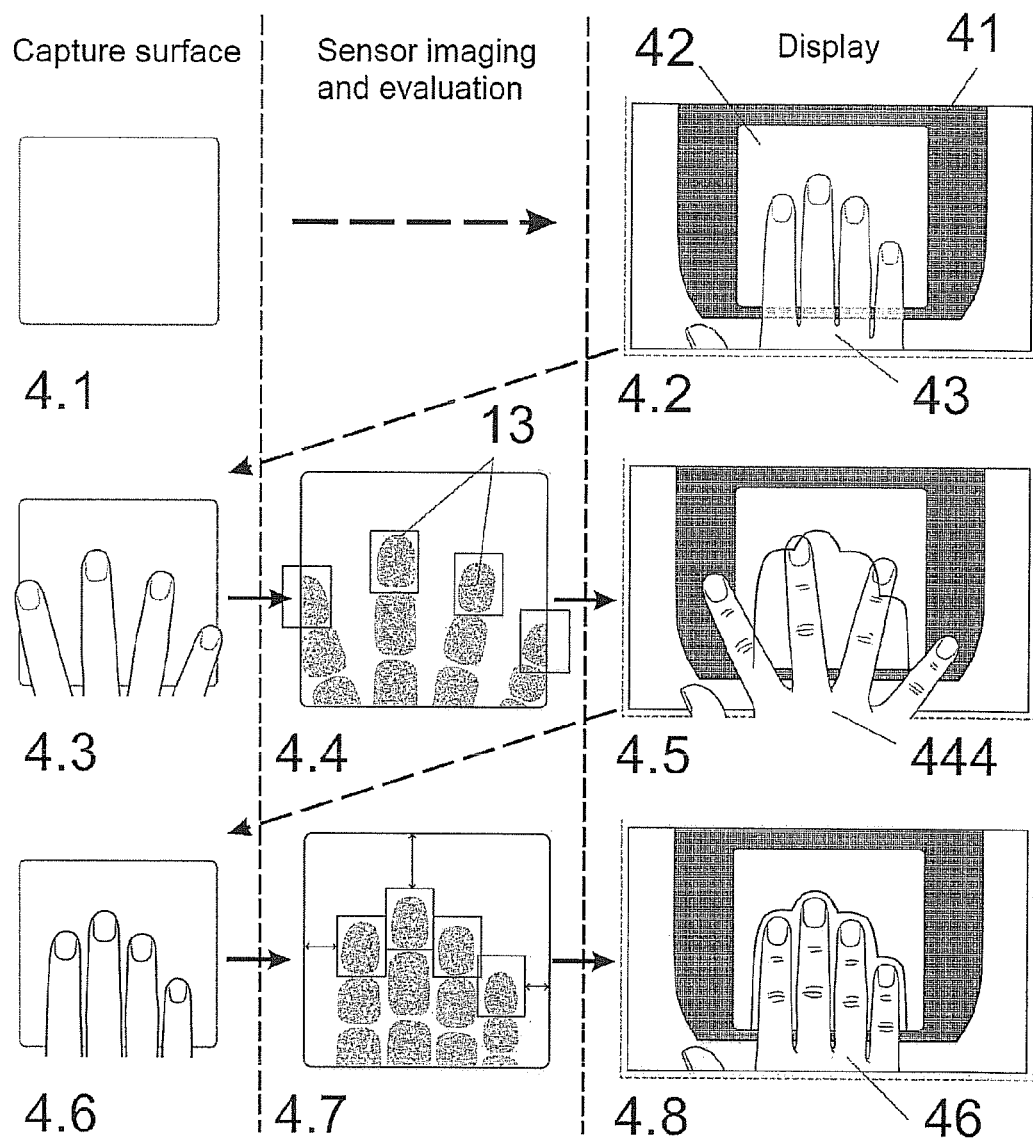
FIGS. 4a and 4b are a schematic illustration of a principle for detecting fingers extending beyond the border of the capture unit and possible graphical user instructions for orienting the fingers in a desired placement position.

In FIG. 4*a*, the user has placed four fingers 12 in an incorrect position on the capture surface 11 (illustration 4.3). In this case, the user's fingers 12 are spread too far apart and two of the four fingers 12 extend over the edge of the capture surface 11, as a result of which two of the four fingerprints 13 expected in the sensor scan (middle column of FIG. 4*a*) are detected as not meeting the minimum size (print area of the first phalange) (illustration 4.4). A display image is generated therefrom in the form of a hand with spread fingers 444 according to illustration 4.5 which requests the user to correct the position in a corresponding manner. To this end, as is shown in illustration 4.5, the requested correct position of the fingers 12 is displayed on the display unit 4 by means of an outline image (transparent ghost hand 43) and is superposed on the actual incorrect position of the finger depiction (hand simulation 44) which is selected (e.g., as full-value colored finger image) from the image storage 3 such that it is associated with the fingerprints 13 determined in the image processing unit 2. Alternatively, the superposition of the incorrectly applied fingers 12 and correctly applied fingers 12 can be shown by different colors (e.g., also false color depiction) or by transparency depiction and colored depiction.

Figure 4B:
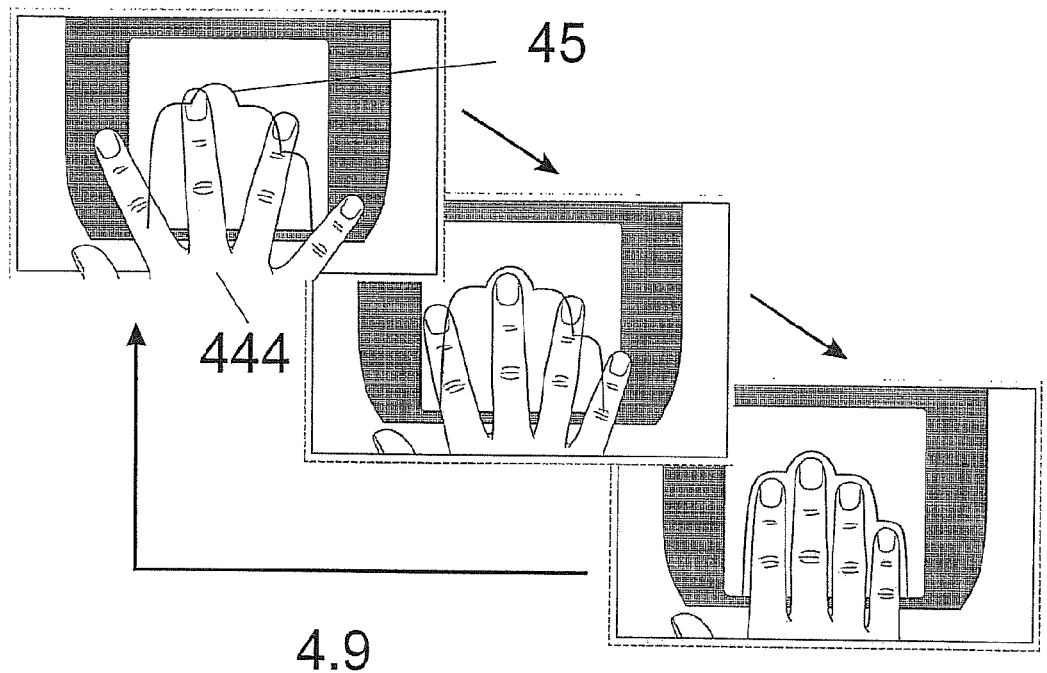
Figure 4B:
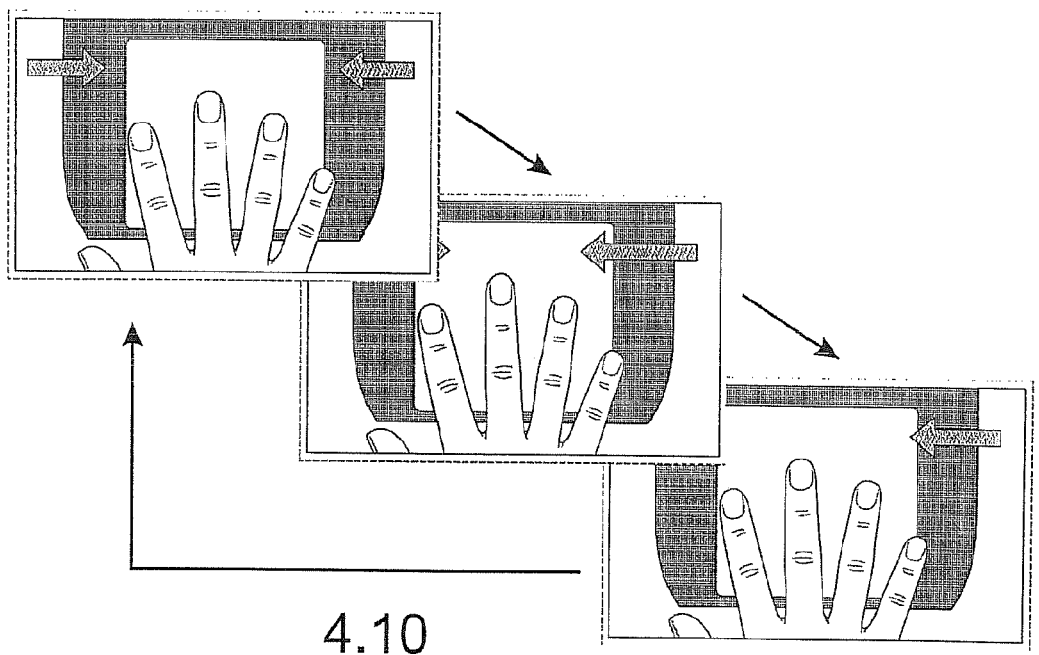

In a configuration according to FIG. 4*b*, the user is prompted through repeated image sequences (illustration 4.9 or 4.10) to suitably reduce the spread of his or her fingers 12 until the minimum distance from the vertical edge is reached. In this case, the quantity of individual images forming the sequence is optional. In the examples according to FIG. 4*b*, a quantity of three images is selected, but there can also be only two images (start and finish or incorrect position and correct position) of hand simulations 44 in a minimal variant (not shown).

Once the user has corrected the position of the four fingers 12 (illustration 4.6), the gray values and size of the applied fingerprints 13 are analyzed again by the image processing unit 2, their distance from the edge of the capture surface 11 is determined (illustration 4.7) and the correct positioning of the fingers 12 is confirmed by the depiction on the display unit 4 (illustration 4.8). The correct positioning of the fingers 12 can be shown by an exact overlapping of the requested position and the achieved position, by a change of color when the correct position is reached, by additional graphical elements (a green dot or a check mark) or by textual elements (e.g., "OK"). It should be understood that the feedback for correction of position shown in FIG. 4*a*, illustration 4.5, or in FIG. 4*b*, illustration 4.9, also without superposition, i.e., only by showing an image sequence of fingers closing, represents an equivalent form of the evaluation and display according to the invention.

Illustration 4.10 shows a further alternative request for correcting the positioning of the fingers 12. In this case, the user is requested by means of two horizontal arrows 47 next to the displayed hand with spread fingers 444 to close his or her fingers 12 so that a minimum distance from the edge of the capture surface 11 is achieved. It will be appreciated as falling within the scope of the present invention that the two arrows 47 can be displayed simultaneously, alternately or in a blinking manner. Further, the arrows 47 can be displayed in such a way that the length of the arrows 47 decreases as the correct minimum distance from the edge of the capture surface 11 is approached so that there is intuitive feedback about the correct measure for positioning the fingers.

Figure 5A:
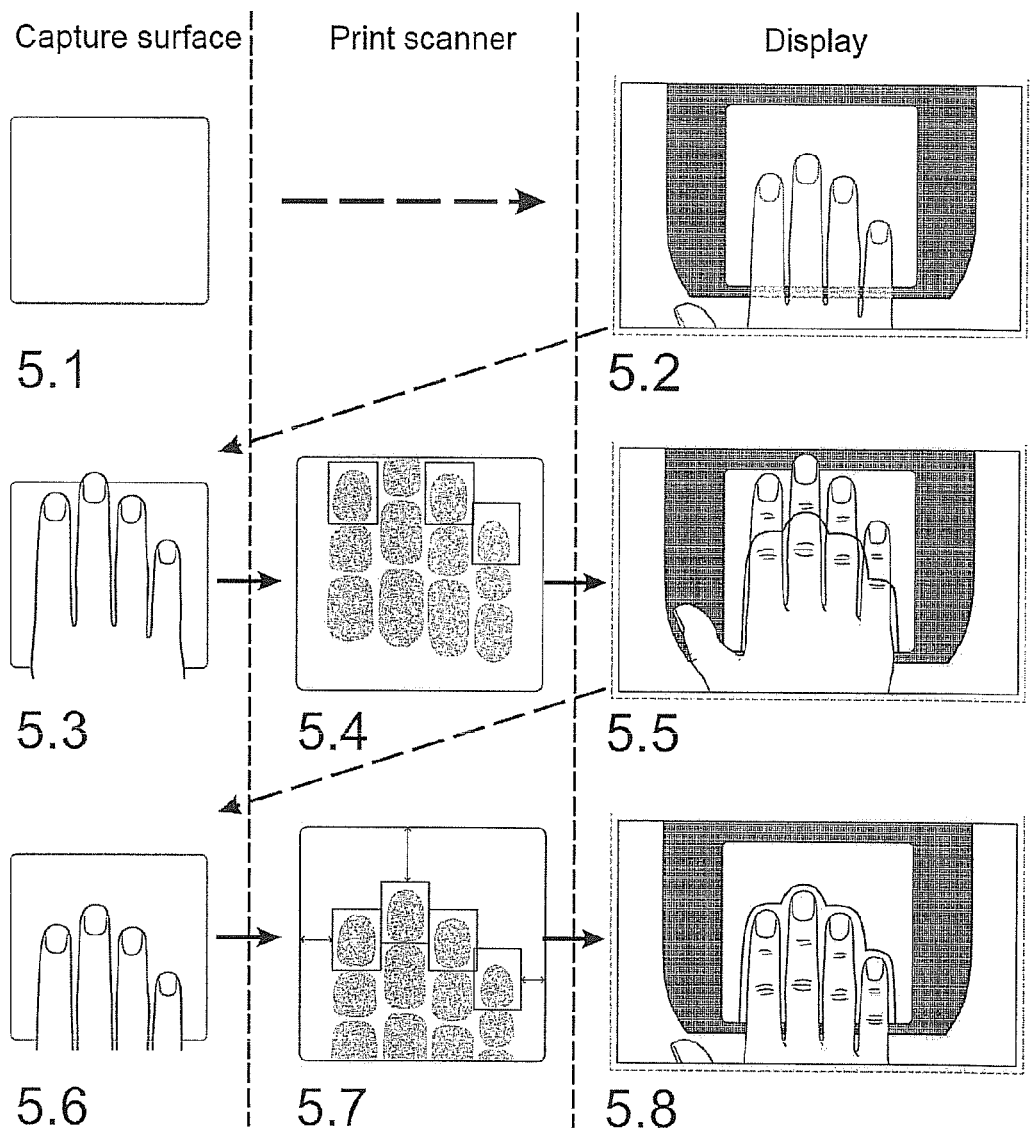
FIGS. 5a and 5b are a schematic illustration of a principle for detecting fingers displaced beyond the border of the capture unit and possible graphical user instructions for displacing the fingers into a desired placement position.

FIG. 5*a* shows four fingers 12 of the right hand which are not correctly positioned (illustration 5.3) with respect to height (i.e., in the vertical dimension of the image capture). In this case, the fingers 12 extend beyond the upper margin of the capture surface 11. The sensor scan detects a total of four objects (fingers 12 of which only the first phalanges are evaluated with respect to size), wherein only three objects are detected as applied in their entirety (illustration 5.4) in that the size of the detected objects is compared with the reference values for a minimum size.

Figure 5B:
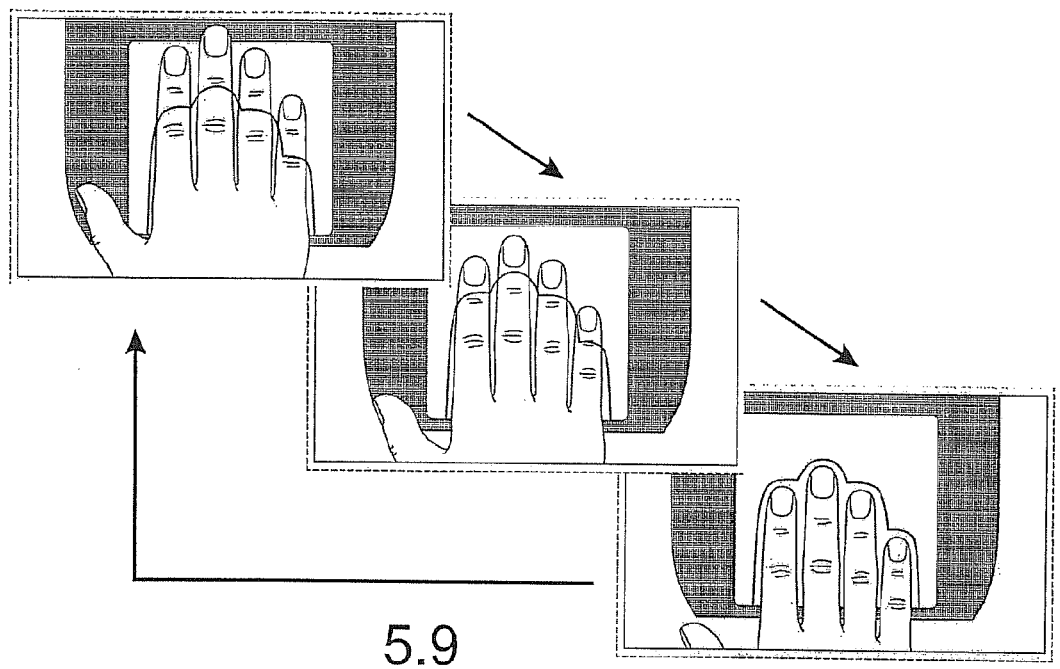
Figure 5B:
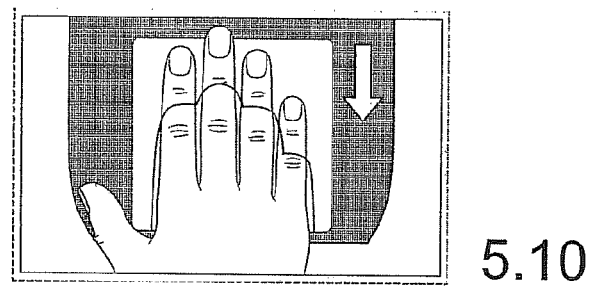
Figure 5B:
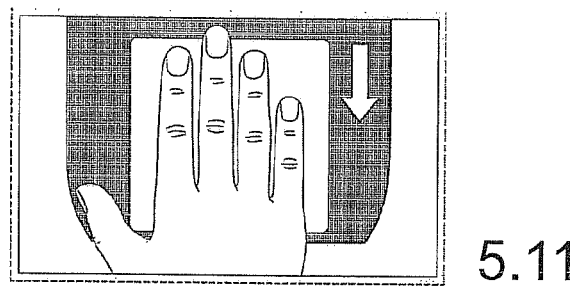

Illustration 5.5 shows the request for correction of the positioning of the fingers 12 shown in illustration 5.3. In this case, the user is prompted in a sequence of images to orient his or her fingers 12 to conform to the optimal position on the capture surface 11. The image sequence shown in FIG. 5*b*, illustration 5.9, can be used for this purpose. Any quantity of displayed steps (image sequence) can be selected; however, there must always be at least two images (incorrect finger position and correct finger position). A display which indicates only the requested positioning of the fingers 12 without superposition and which thus instructs the user to apply his or her fingers 12 in accordance with the display on the display unit 4 is also possible.

Alternative representations of the request to correct position are shown in FIG. 5*b*. In illustration 5.10, the user is requested to correctly position the fingers by the representation of a ghost hand 43 for the correct finger position and by displaying an arrow 47 for the movement direction. Alternatively, illustration 5.11 indicates the correction of position only by means of an arrow 47 without superposing the correctly positioned ghost hand 43 on the hand simulation 44. Here also, it lies within the scope of the invention that the arrows 47 change dynamically with the correction of position and, if necessary, blink or change color.

Figure 6A:
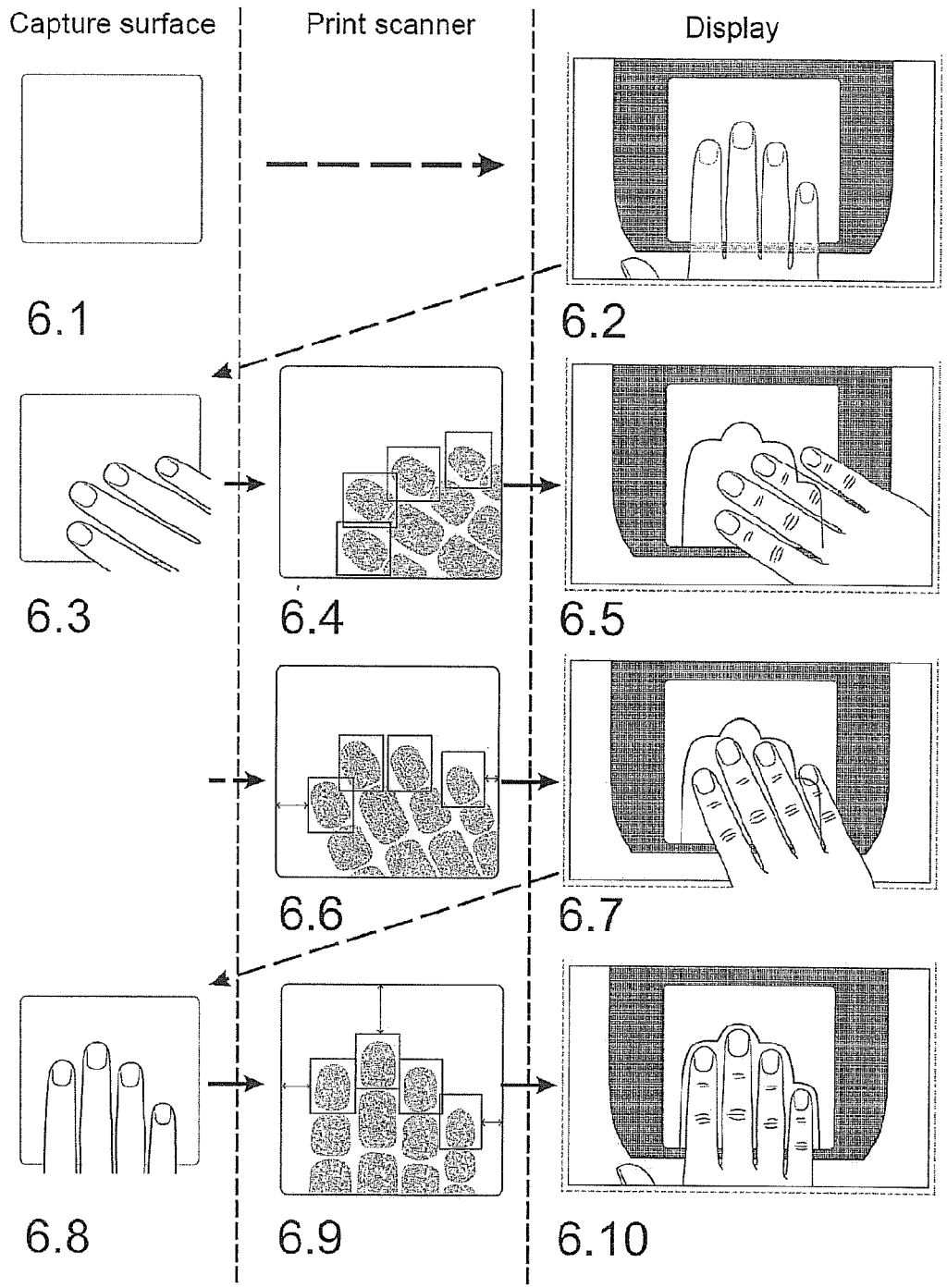
FIGS. 6a and 6b are a schematic illustration of a principle for detecting fingers which are applied obliquely to the capture unit and possible graphical user instructions for rotating the fingers into a desired placement position.
Figure 6B:
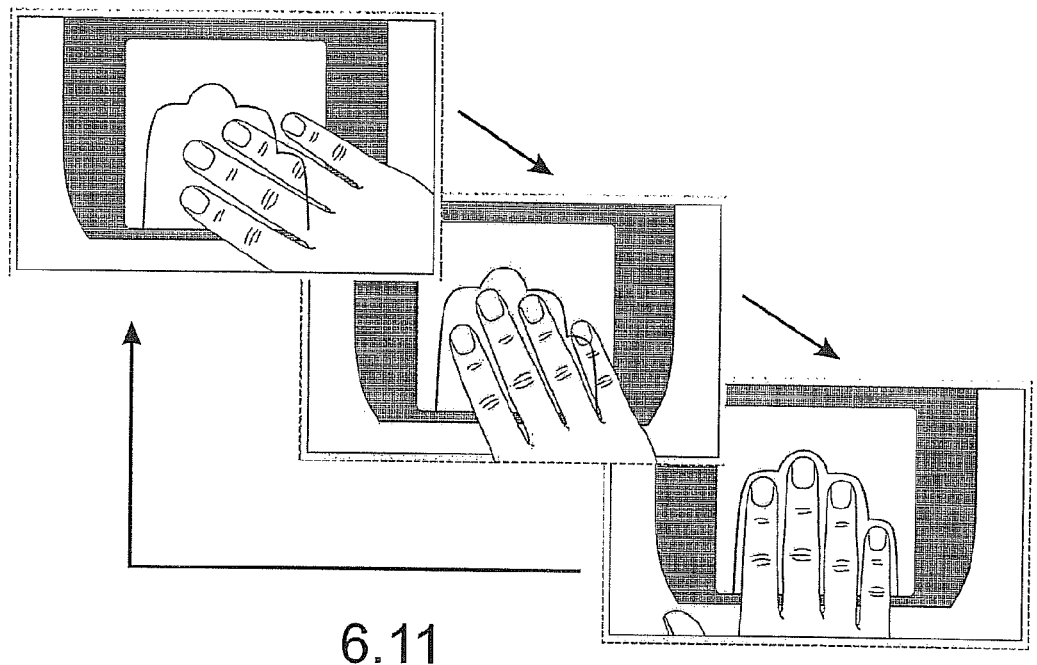
Figure 6B:
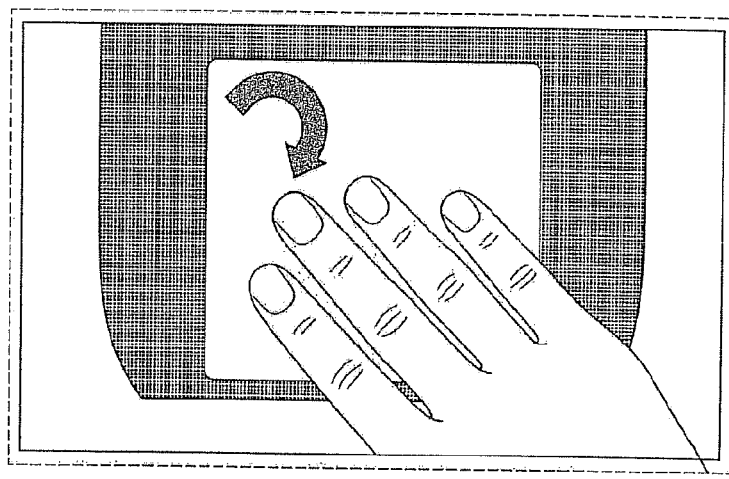

A further example of an incorrect positioning of the fingers 12 is shown in FIG. 6*a*. In this case, the fingers 12 are located at a sufficient distance from the edge of the capture surface 11, but are not oriented perpendicular to or parallel to the side edges of the capture surface 11 (illustration 6.3). Illustration 6.4 shows the associated sensor scan and illustration 6.6 shows a subsequent evaluation after initial correction of the finger position. The incorrect position is determined in the image processing unit 2 by the size (surface area) of the detected objects (first phalanges) by means of the circumscribing rectangles 14 mentioned above. The ratio of sides of the objects is then calculated and is examined more closely if a previously defined ratio of length to width of the applied objects is not achieved (illustration 6.9). To this end, the size proportion is determined in the same way as described above when calculating size for detecting the objects and if it is determined that the calculated axis of inertia has an inclination which meets or exceeds a higher inclination threshold (e.g., ≥10°), the user is requested to correct the position of the fingers 12. In a preferred variant according to illustrations 6.5 and 6.7, the correction request can be carried out by superposing the hand generated from the image storage 3 so as to be rotationally offset 446 relative to the finger outline 45 of the ghost hand 43. In FIG. 6*b*, illustration 6.11 shows a possibility for requesting position correction by means of image sequences which are displayed repeatedly on the display unit 4 and which include at least three images for rotating the hand until reaching the end position, which is displayed as finger outline 45 of the fingers (ghost hand 43), parallel to the side edges of the capture surface 11.

Illustration 6.12 shows an alternative to illustration 6.11 for displaying position correction. In this case, rotation of the hand is requested by superposing a curved arrow 47. The length of the arrow can be displayed such that it decreases as the hand approaches the requested final position.

Figure 7A:
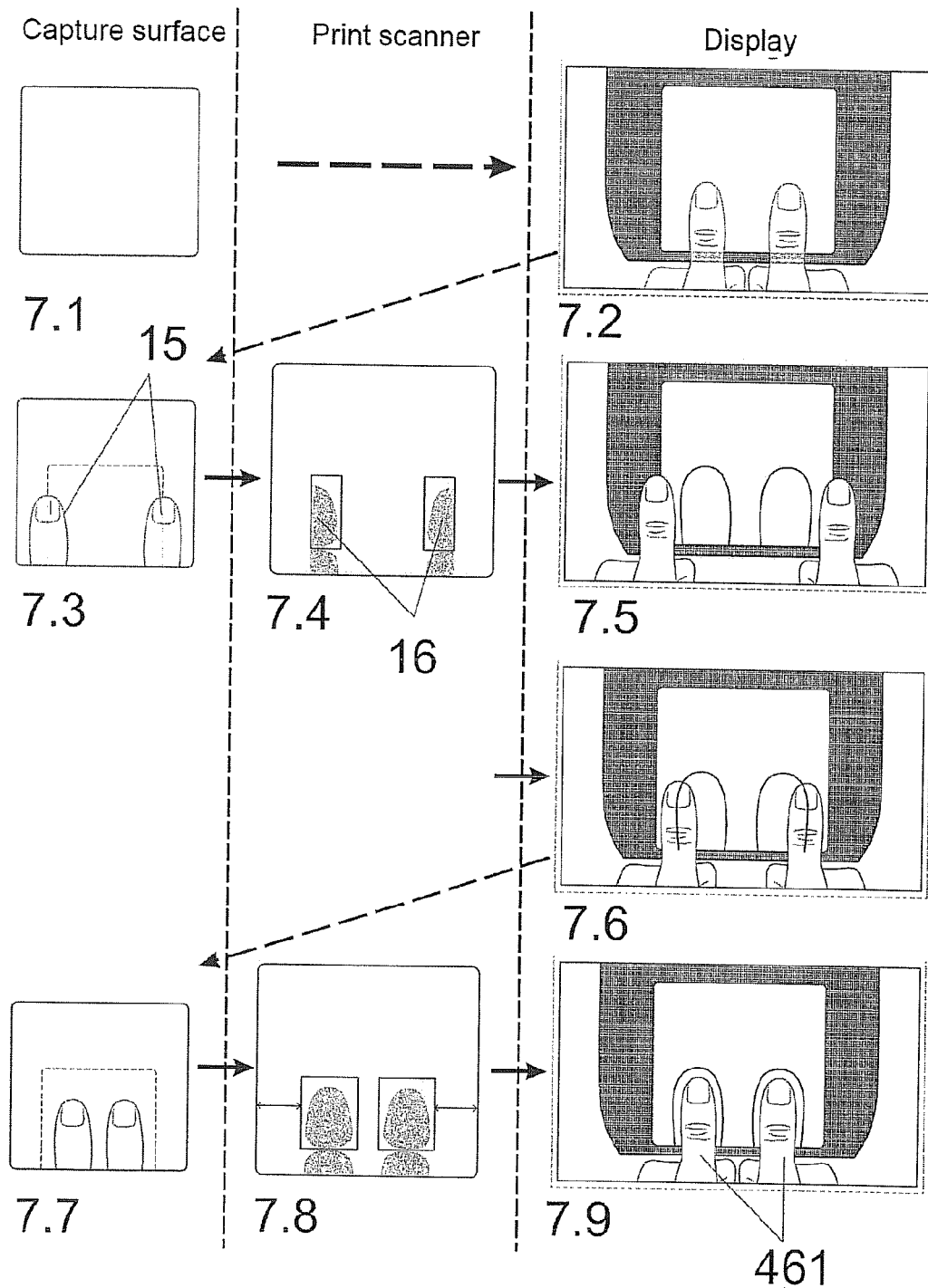
FIGS. 7a and 7b are a schematic illustration of a principle for detecting a placement position of both thumbs on the capture unit and possible graphical user instructions for achieving a desired placement position.

FIG. 7*a* shows another example for two incorrectly positioned fingers 12, in this case the thumbs 15 of both hands. With the capture surface 11 empty, the user is first prompted to present both thumbs 15 by means of the display unit 4 which shows a ghost thumb 48 with two thumb depictions side by side. When placed upon the capture surface 11, the thumbs 15 in this case are at an insufficient minimum distance from the edge of the capture surface 11 (illustration 7.3). For this finger placement situation, the allowed capture surface 111 does not correspond to the entire available capture surface 11 but rather is limited to a predefined section. The capture format for two fingers of 1.6 inches×1.5 inches cited in the FBI-IQS standard is selected here by way of example.

Illustration 7.4 shows the corresponding sensor scan in which the thumb prints 16 were found outside of the allowed capture surface 111. In this case also, as in the previous examples, the actual position of the objects on the (total) capture surface 11 is determined in the image processing unit 2 by analyzing the gray values and size of the objects, these values are compared with the predefined capture format of the allowed capture surface 111, and the results are conveyed to the user correspondingly by the display unit 4 (illustration 7.5). As is shown in illustration 7.4, the placement of the thumbs 15 outside of the allowed capture surface 111 is determined by a limited sensor readout (known as ROI readout) or subsequent back-calculation to the format of the allowed capture surface 111 resulting in surface areas of the cut-off thumb prints 16 that are too small and do not meet a predefined threshold value. Consequently, the request for correction is made to the user by displaying an offset thumb depiction 481 and, additionally, two separate finger outlines 45 in illustrations 7.5 and 7.6. After the user moves the thumbs 15 into the allowed capture surface 111 (illustration 7.7), complete thumb prints 17 (illustration 7.8) are detected in the sensor depiction. Illustration 7.9 then shows the user the correct thumb depiction 482.

In order to make it clear that the user has not applied any other two fingers 12, comparisons can be made with empirical threshold values for the thumb surface, with the surface areas of the previously captured fingers 12 (e.g., index finger or middle finger), or a direct comparison with the fingerprints 13 that have already been stored.

Figure 7B:
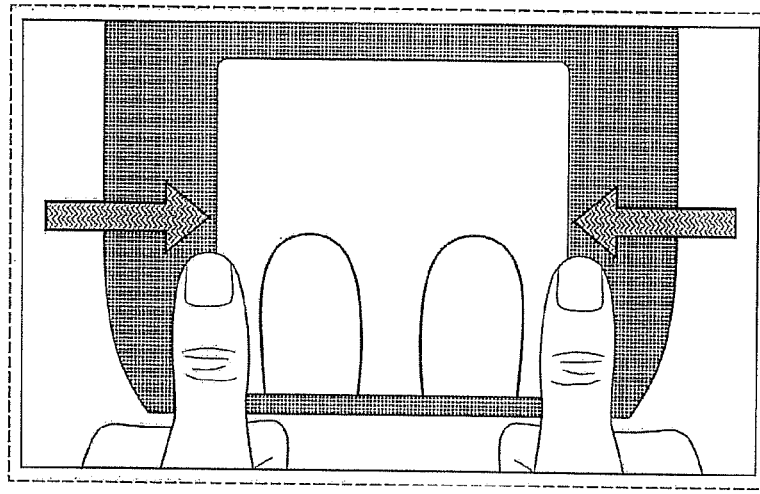
Figure 7B:
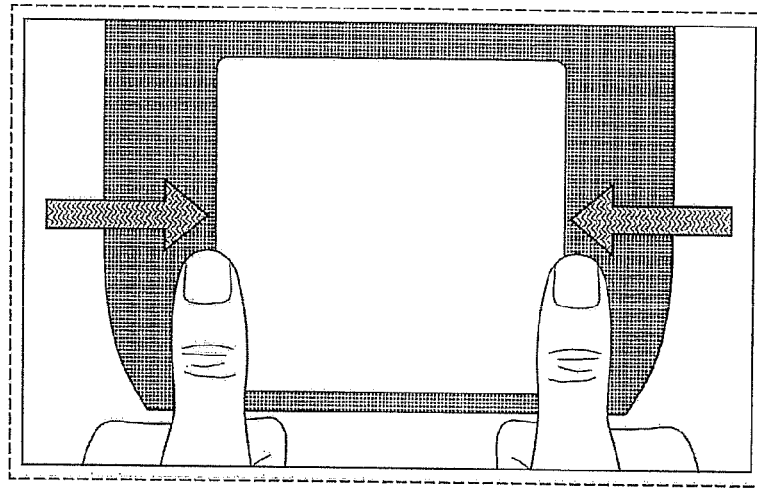

The request for correction of the thumb position is shown in illustrations 7.5, 7.6 and 7.9 as an image sequence as seen by the user on the display unit 4 when placing the thumbs 15 on the capture surface 11 from illustration 7.3 to illustration 7.7 until the thumbs 15 are correctly positioned. However, these images can also be animated in the same manner in the results of the sensor scan according to illustration 7.4 from the image storage 3 without changing the thumb positions. The position of the two thumbs 15 which is correctly identified by the sensor scan is shown in illustration 7.8. Alternatively, the user is requested for position correction in FIG. 7*b* by a static or dynamic display of the arrow 47 (illustration 7.10 with superposition, illustration 7.11 without superposition).

Third Parameter: Correct Finger Pressure

As was already mentioned above, the pressure exerted on the finger 12 to be captured is an efficient option for generating the optimal contrast for a fingerprint 13 of sufficient quality. On the other hand, sufficient contrast is a prerequisite for generating a mask in the form of a rectangle 14 surrounding the fingerprint 13 and for subsequent detection of minutiae for comparing fingerprints with those from a database 6.

Accordingly, it is particularly important to provide feedback for the user of the fingerprint scanner 5 which determines the contrast of the applied fingers 12 in real time and generates therefrom an easily understandable indication of the correction of application pressure to be performed by the user. This feedback must be carried out in such a way that the inexperienced user immediately grasps how to alter the pressure on the finger 12 in order to capture a high-quality fingerprint 13 without requiring any knowledge on the part of the user pertaining to the interrelationships of contrast optimization described above.

It is assumed in FIG. 8*a* that the user has placed four fingers 12 on the capture surface 11 (illustration 8.1). It is assumed that insufficient pressure is exerted as is shown by the sensor scan in illustration 8.2. The image processing unit 2 analyzes the contrast of the fingerprint 13 based on the segmentation of four objects (first phalanges) carried out previously. For this purpose, every pixel of the object can be adopted in a histogram and the dark pixel component (dark pixels, e.g., >40% intensity attenuation in relation to mean intensity of light pixels) and standard deviation can be determined from this histogram. By comparing the dark pixels with a predetermined threshold value and comparing the standard deviation, whether or not the latter lies within a predefined range of values, the contrast is evaluated as "too bright", "good" or "too dark" for each of the four detected objects (prints of the first phalanges). The results are displayed to the user by the display unit 4.

The ideal pressure is preferably indicated as an enlarged finger outline 45 around the fingers of the correct hand depiction 46 which has a shape adapted to the finger shape (i.e., a similar but enlarged shape). Illustration 8.3 shows that too little pressure is exerted. This depiction is generated from the detected fingerprints 13 with too little contrast 18 (illustration 8.2) in that a region resembling a finger aura 451 (or a finger shadow) is indicated around the hand depiction 46 derived from the sensor scan, which region is imaged in this case smaller than the enclosed area of an enlarged finger outline 45 characterizing the optimal contrast. This signalizes that more pressure is to be exerted in order to achieve the correct contrast which fills up the area enclosed by the finger outline 45. The display unit 4 can show that the optimal pressure has been reached when fill color (or fill pattern) reaches the enlarged finger outline 45 (illustration 8.11). To achieve this end result, the parameters of dark pixel and standard deviation (of the predefined gray value of the intensity) are continuously analyzed by the image processing unit 2 and the results are shown on the display unit 4 as a specific equivalent of a pressure reading. The pressure-equivalent depiction is then shown around the fingers of the hand depiction 46 as a colored region which becomes wider around the hand depiction 46 the greater the pressure exerted by the finger 12 on the capture surface 11. If the fingers 12 are applied with too little pressure, the displayed color (or pattern) area is smaller than the finger outline 45 specified for the optimum pressure (illustration 8.3).

Illustration 8.5 shows the case in which too much pressure is exerted on all fingers 12. The objects detected by the sensor are again examined in a histogram for the threshold values of dark pixels and standard deviation, and the results are shown in illustration 8.4 as fingerprints with too much contrast 19 (pressure). In this case, the fill color (or fill pattern) around the displayed hand depiction 46 extends beyond the enlarged finger outline 45 and therefore shows a finger aura 452 that is too high (illustration 8.5) which instructs the user to exert less pressure on the fingers 12.

In view of the fact that the fingerprints 13 of the individual fingers 12 are evaluated separately, it is also possible to indicate the pressure of the individual fingers 12 in an intelligible manner (see illustrations 8.6 to 8.9). In illustration 8.6, too much contrast (pressure) is determined at the index finger. Therefore, the finger outline 45 around the index finger for optimal pressure is already exceeded in illustration 8.7, whereas the correct pressure is exerted on the rest of the fingers 12. According to the display in illustration 8.7, the pressure of the index finger on the capture surface 11 must be reduced. On the other hand, too little contrast (pressure) is determined at the ring finger in illustration 8.8. Therefore, the finger outline 45 for optimal pressure around the ring finger is not reached, while fingerprints with the correct contrast 20 are determined for the rest of the fingers 12 so that the pressure is correct and need not be adjusted. Therefore, according to the indication in illustration 8.9, more pressure must still be exerted on the ring finger to achieve the ideal pressure (and therefore the ideal contrast) in the sensor scan (illustration 8.10) and the "good" indication according to illustration 8.11.

Illustration 8.11 shows the depiction on the display unit 4 when achieving the optimal pressure (or contrast) preceded by the sensor scan shown in illustration 8.10 with fingerprints having the correct contrast (pressure) 20. In this case, the entire area around the fingers is filled up to the enlarged finger outline 45 with the fill color (shown here as a dot pattern) so that the optimal fingerprint aura 453 is displayed.

FIG. 8b shows a depiction of the pressure of individual fingers. In illustration 8.12, too little pressure is exerted by the index finger of the right hand. Illustration 8.16 shows the opposite case where too much pressure is exerted on the index finger of the right hand.

It will be appreciated that it lies within the scope of the present invention to represent the depiction of too much pressure or too little pressure dynamically with a change in pressure on fingers 12. Illustrations 8.12 to 8.16 show exemplary images of a sequence for depicting too little pressure (illustrations 8.12, 8.13), the correct pressure (illustration 8.14) and too much pressure (illustrations 8.15, 8.16).

In FIG. 8c, illustration 8.17 shows an alternative depiction as animation for the user of the fingerprint scanner 5 for increasing the pressure of finger 12 on the capture surface 11, wherein too little pressure is illustrated graphically in the form of a stylized analog display as a manometer with a low pressure reading 471. Illustration 8.18, on the other hand, requests a reduction in pressure by showing a manometer with a high pressure reading 472. The manometer needle rises (or falls) as pressure is continuously increased (or decreased).

Illustration 8.19 is a further alternative depiction for the existing pressure or the pressure to be exerted. In this case, the correct pressure was exerted on the finger 12. The display shows the pressure level achieved by pressing the finger 12 by means of a vertically displaceable arrow 47 next to a unitless scale 473.

Fourth Parameter: Movement of the Fingers

The average image capture time for an individual image of the applied fingers is about 200 ms to 300 ms. The image processing unit 2 requires about 1 to 2 seconds to assess a sufficiently good fingerprint quality with respect to contrast, number and position of fingers 12; that is, approximately 5 to 10 individual images are evaluated. Within this time period, it is necessary that the fingers 12 do not move on the capture surface 11.

FIG. 9a shows moving fingers 12 applied to the capture surface 11. In illustration 9.1, it is assumed that four fingers 12 are placed on the capture surface 11 but are moved. Accordingly, there is a continual change in position of the fingers 12. The change in position is analyzed by the image processing unit 2 by evaluating the gray values and is transmitted to the display unit 6 as feedback. In this case, the location of the detected fingerprints 13 is compared with the first position over a defined period of time. If the position does not change within the fixed quantity of locations to be compared, it is assumed that the fingers 12 are not moving. Illustrations 9.2, 9.3, 9.5 and 9.7 show this comparison by way of example for assumed motion of the fingers 12. For this purpose, the first location of the detected objects was determined in illustration 9.2. The image 9.3 of the detected objects is compared with the first location (from image 9.2). In this case, a displacement of the location is determined (in image 9.3, the first location is represented by lighter shading). A third location of the fingers 12 is shown in image 9.5. This third location is compared with the second location from image 9.3. In this case, a displacement of the location is again determined and a fourth location shown in illustration 9.7 is detected. This fourth location is compared with the third location from image 9.5, wherein no further change in location is determined. It is assumed that the location of the applied fingers 12 now no longer changes (fingers 12 no longer move) and that the locations in illustrations 9.5 and 9.7 subsequently remain constant. This location which no longer changes over three successive sensor scans is evaluated as an immobile position of the fingers 12.

Illustrations 9.4 and 9.6 show examples of feedback for the movement of the fingers 12. In this case, the border around the hand with motion simulation 447 is shown in a superposition of two hand depictions. This superposition can take place in several steps. For the user, this superposed depiction symbolizes blurriness of the applied fingers 12 and, therefore, movement of the fingers 12. As is shown in FIG. 9b (top), this superposition can be carried out by different transparency steps or by different colors or color gradations horizontally (illustration 9.10) and vertically (illustration 9.12) in both directions. Once the position of the fingers 12 ceases to change within a defined period of time, the superposition of the displayed fingers 12 from illustration 9.10 or 9.12 is terminated and the correctly placed fingers 12 are shown (illustration 9.11).

Illustrations 9.13 to 9.15 show an alternative feedback for information about moving fingers 12 through a changing quantity of concentric arcs 474 for indicating vibration around an animated hand depiction 46. These concentric arcs 474 can change dynamically according to the extent of the change in position of the fingers 12. The more concentric arcs 474 are shown, the greater the movement. In the present example, it is assumed that the applied fingers 12 (illustration 9.1) initially change position drastically (illustration 9.13) and the change in position decreases (illustrations 9.14 and 9.15) until reaching a stable position of the fingers 12 in which no change in position is analyzed any longer by the image processing unit 2 (illustration 9.11).

Fifth Parameter: Correct Hand

More than anything else, the most important prerequisite for the smoothest possible flow of the fingerprinting process is that the user presents the correct hand. Confusion between the right and left hand poses a common problem, particularly when the four fingers of a hand are applied simultaneously. A solution is called for which makes it possible to distinguish between the right hand and left hand and to request the user to change hands in an easily understandable manner.

Figure 10A:
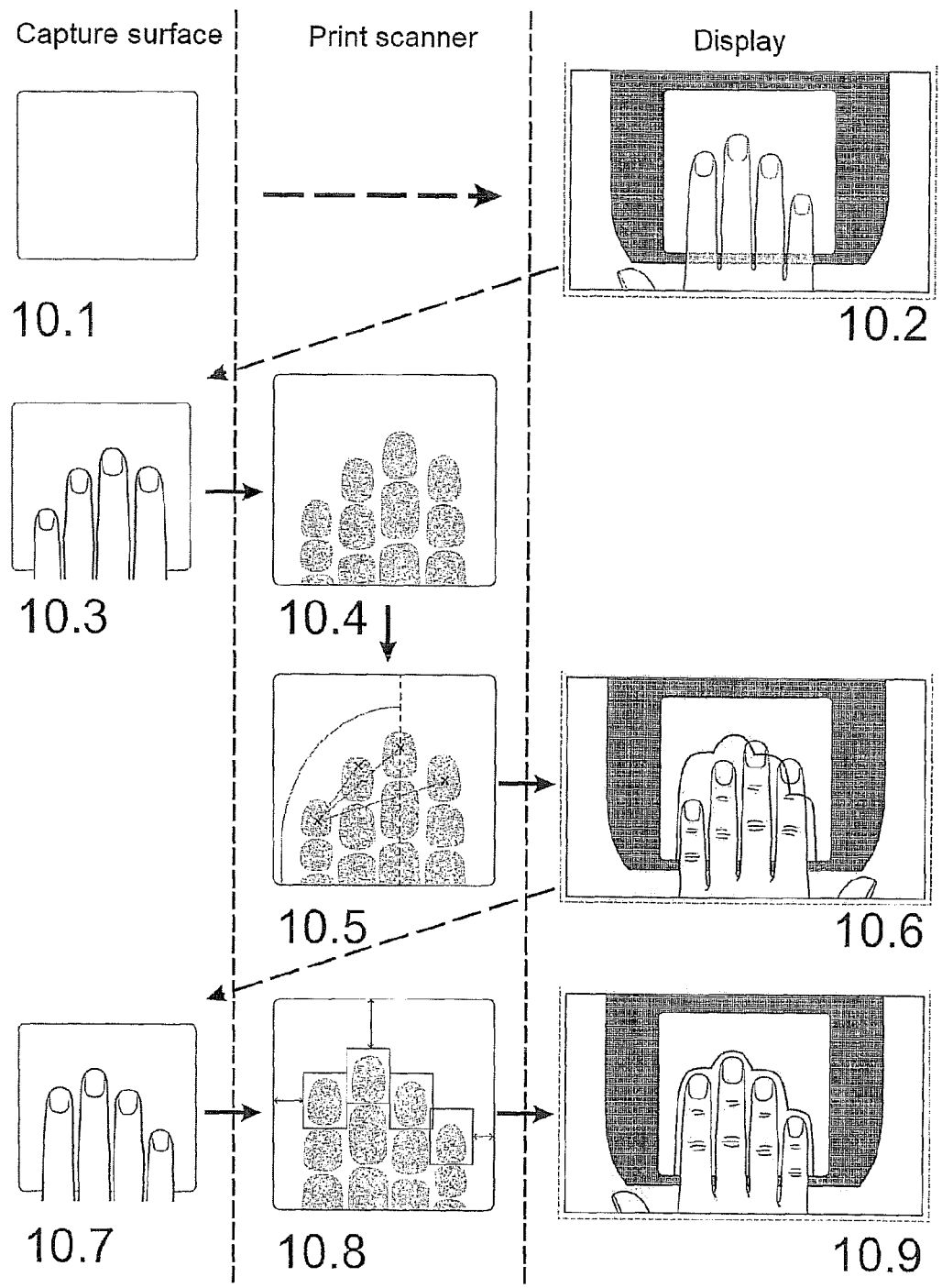
FIGS. 10a and 10b are a schematic illustration of a principle for detecting a left hand that has been incorrectly placed on the capture unit and possible graphical user instructions for changing the hand.

In FIG. 10*a*, it is assumed by way of example that the user is requested to present the four fingers 12 of the right hand (illustration 10.2), but the left hand (wrong hand 448) is applied (illustration 10.3). The four objects are detected in the capture unit 1 during the sensor scan (illustration 10.4) and it is determined in the image processing unit 2 through analysis of the angles of the fingerprints 13 relative to one another (illustration 10.5) that the wrong hand 448 has been applied, whereupon feedback is transmitted to the display unit 4 (illustration 10.6). In this case, the analysis is based on the fact that the fingers 12 of the human hand are always typically proportionate to one another (see, e.g., A. Buryanov, V. Kotiuk, Proportions of Hand Segments, Int. J. Morphol., 28(3): 755-758, 2010). On this basis, a previously defined angular relationship 21 of the fingerprints 13 located farthest to the left to the rest of the fingerprints is determined in relation to the mean angle of the whole hand and is calculated with the angular relationship 21 determined from the applied fingers 12 by sensor scan of the capture unit 1 (illustration 10.5). If the angular relationship 21 given by the applied fingers 12 does not match the predefined angular relationship, it is assumed that the wrong hand 448 was applied and that, therefore, the corresponding template of the wrong hand 448 was retrieved from the image storage 3 and must have been displayed on the display unit 4.

Figure 10B:
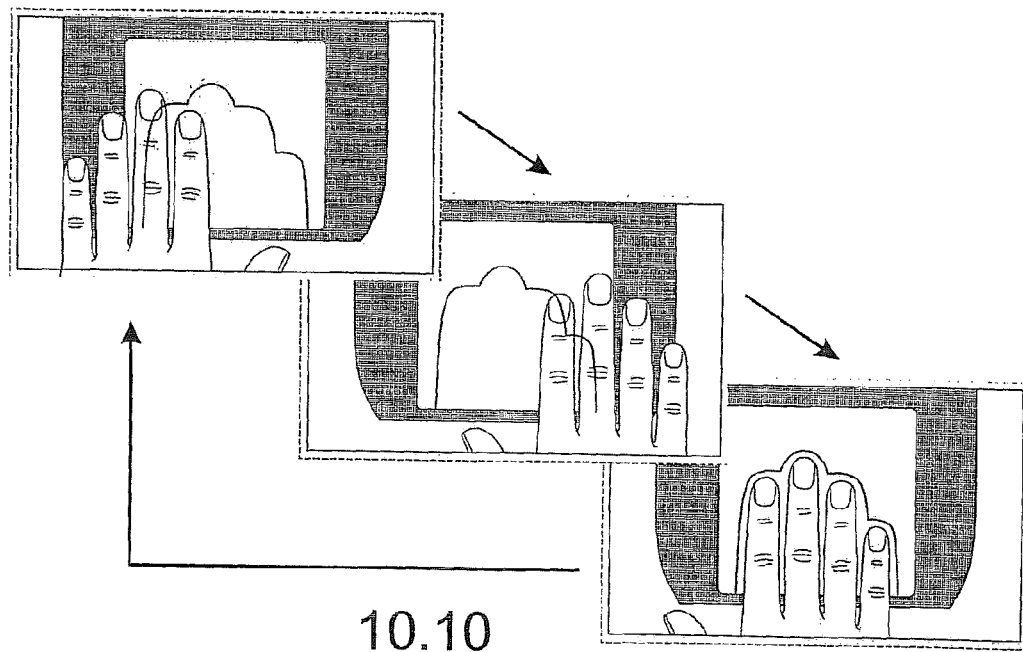
Figure 10B:
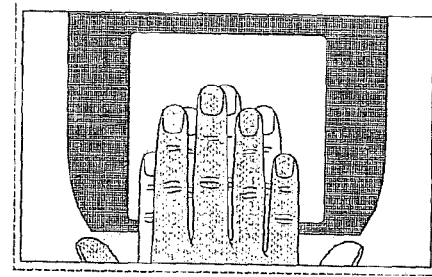
Figure 10B:
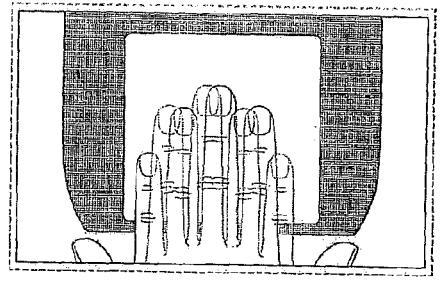

FIG. 10*b* shows alternative displays to illustration 10.6 from FIG. 10*a* which instruct the user that the wrong hand 448 was applied. In this case, the requested state is shown by a finger outline 45 and the incorrectly applied hand 448 superposed thereon. Illustration 10.10 shows an animation instructing the user to present the correct hand 449. In so doing, the incorrectly applied hand 448 moves out of the finger outline 45 in an image sequence and the correct hand depiction 46 moves into the finger outline 45 until the correct hand depiction 46 is located within the finger outline 45. This takes place until the image processing unit 2 determines a matching angular relationship 21 between the requested hand and the presented hand through analysis. When the correct hand 449 has been applied (illustration 10.7 from FIG. 10*a*) and a corresponding sensor scan has been achieved (illustration 10.8), the user is informed of this by the display unit 4 as is shown, for example, in illustration 10.9. In this case, the applied hand is located within the finger outline 45.

Instead of a finger outline 45, the requested hand can also be depicted by a differently colored or transparent correct hand 449 with which an overlap must be achieved with the applied fingers 12 of the actual hand depiction 46 (illustration 10.11 or 10.12).

The sequence of parameters assessed in the above description and the information displayed to the user can be combined in any way and the sequence and type of display selected in the description do not constitute a limiting of the invention. Fingerprints 13 within the meaning of the present invention include individual fingers or any combination of more than one finger 12. Broadly, the invention includes both flat fingerprints and rolled fingerprints. The focal point of the assessment for high image quality of the fingerprints 13 is the pressure with which the user presses the fingers 12 on the capture surface 11. However, other parameters may be preferred or individual parameters may be omitted from the assessment by the image processing unit 2 and/or from the depiction on the display unit 4 without departing from the basic teaching of the invention.

LIST OF REFERENCE NUMERALS

1 capture unit
11 capture surface
111 allowed capture surface (for thumbs)
12 finger
13 fingerprint
14 circumscribing rectangle
15 thumb
16 cut-off thumb print
17 (complete) thumb print
18 fingerprint with too little contrast (pressure)
19 fingerprint with too much contrast (pressure)
20 fingerprint with correct contrast (pressure)
21 angular relationship (for left/right hand)
2 image processing unit
3 image storage
4 display unit
41 stylized device surface
42 stylized capture surface
43 ghost hand
44 hand simulations (templates)
441 hand with absent finger
442 hand with differently colored finger
443 hand with finger in dashed lines
444 hand with spread fingers
445 hand with fingers extending too far
446 hand with rotational offset
447 hand with movement simulation
448 wrong hand
449 (offset) correct hand
45 (enlarged) finger outline
451 finger aura which is too low (too little contrast)
452 finger aura which is too high (too much contrast)
453 optimal finger aura (correct contrast)
46 correct hand depiction
47 arrow
471 manometer with low pressure reading
472 manometer with high pressure reading
473 unitless scale
474 concentric arcs for vibration reading
48 ghost thumb
481 offset thumb depiction
482 correct thumb depiction
5 fingerprint scanner
6 database

What is claimed is:

1. A method of capturing fingerprints of sufficiently high quality based on fingerprint scanners comprising:

capturing fingerprints of fingers placed upon a capture surface as a sensor image;

analyzing said sensor image for relevant objects to determine fingerprints with regard to their quantity and position on the capture surface by (1) searching prints of first phalanges of the fingers as dark pixel areas, (2) providing rectangles circumscribing the prints, and (3) determining a position of the prints by using a center of mass, surface area and orientation of the rectangles for purposes of comparing first phalanges prints with reference presets;

comparing an actual position and an actual quantity of the fingers placed on the capture surface with the reference presets for position, quantity and type of fingerprints;

accessing an image storage with a library comprising a plurality of animated images corresponding to a plurality of conditions of fingers placed on the capture surface and to the reference presets;

selecting images or series of images out of the image storage which correspond to a deficient placement of fingers derived from image analysis for determining quantity and position of fingerprints and representing a positive finger depiction that shows the fingers as a back view seen by a person who placed the fingers on the capture surface; and displaying the selected positive finger depiction in the form of two-dimensional images on a display unit for animating the finger-placing person to remedy the deficient placement of fingers.

2. The method according to claim 1, further comprising determining any deviation from a predetermined quantity of phalanges prints of the reference presets for selecting a correspondingly adapted positive finger depiction from the library of the image storage.

3. The method according to claim 2, further comprising supplementing absent fingers by corresponding reference presets and displaying the absent fingers with deviating patterning.

4. The method according to claim 3, further comprising selecting the deviating patterning from different types of borders, shading, fill colors or fill patterns.

5. The method according to claim 1, further comprising displaying positive finger depiction despite of absent parts of fingerprints resulting from exceeding margins of the capture surface by supplementing absent parts of fingers with finger image data from the library of the image storage and by oppositely-directed arrows.

6. The method according to claim 1, further comprising detecting and displaying oblique positions of the fingers by determining deviations in a ratio of length to width of the captured fingerprints in relation to the reference presets.

7. The method according to claim 6, further comprising displaying positive finger depiction despite absent parts of fingerprints resulting from exceeding the margins of the capture surface by supplementing absent parts of the fingers with finger image data from the library of the image storage, and displaying instructions for correction using a finger outline corresponding to the reference preset.

8. The method according to claim 6, further comprising determining a deficient size or deficient contrast of fingerprints through analysis of gray value histograms, standard deviation and subsequent threshold evaluation.

9. The method according to claim 8, further comprising:
determining a deficient size or deficient contrast of fingerprints resulting from insufficient pressure on the capture surface is determined relative to the reference presets; and displaying an enlarged finger outline surrounding the positive finger depiction by a constant distance and a patterned region surrounding each positive finger depiction as a finger aura of a size depending on the applied pressure, and signaling an optimal applied pressure on the capture surface when the finger outline is reached.

10. The method according to claim 6, further comprising determining an incorrect orientation of fingerprints by analyzing ratios of sides of a circumscribing rectangle and distances from an edge of the capture surface and displaying the incorrect orientation by rotating arrows.

11. The method according to claim 6, further comprising determining an incorrect orientation of fingerprints by analyzing ratios of sides of a circumscribing rectangle and distances from an edge of the capture surface, and displaying instructions for correction using a finger outline corresponding to the reference preset.

12. The method according to claim 1, further comprising:
determining a contrast of the fingerprints through analysis of gray value histograms, standard deviation and subsequent threshold evaluation in relation to the reference presets and displaying an enlarged finger outline; and
displaying a patterned region surrounding each positive finger depiction as a finger aura of a size depending on the applied pressure, and further displaying a finger outline surrounding the positive finger depiction by a constant distance and signaling an optimum applied pressure on the capture surface when the finger aura of each finger meets the finger outline.

13. The method according to claim 1, further comprising:
determining a contrast of the fingerprints through analysis of gray value histograms, standard deviation and subsequent threshold evaluation in relation to the reference presets; and
displaying an analog pressure reading as a linear symmetrical unitless scale, wherein too much pressing pressure on the capture surface is signalized by an upward arrow movement along the scale and too little pressing pressure on the capture surface is signalized by a downward arrow movement.

14. The method according to claim 1, further comprising monitoring an immobile position of the fingers through analysis of distance relationships from edges of the capture surface over a defined time interval, and displaying double-images of the positive finger depiction for those events in that positions of the center of mass of the determined fingerprints are not constant over more than three successively captured sensor images.

15. The method according to claim 1, further comprising monitoring an immobile position of the fingers through analysis of distance relationships from edges of the capture surface over a defined time interval, and displaying as a quantity of concentric arcs next to the positive finger depiction for those events in that positions of the center of mass of the determined fingerprints are not constant over more than three successively captured sensor images.

16. The method according to claim 14, wherein motion of a finger is only displayed if the positions of the center of mass of the determined fingerprints move more than 15 pixels within 750 ms.

17. An arrangement for capturing fingerprints comprising:
a capture unit associated with an image processing unit for analyzing quality criteria and for sending only fingerprints of predetermined quality criteria to a database;
an image storage with a library comprising a plurality of animated finger position images; and
a display unit designed to display animated finger position images retrieved from the image storage depending on results of analysis of the fingerprints by the image processing unit associated with the capture unit, the analysis determining fingerprints with regard to their quantity and position on a capture surface by (1) searching prints of first phalanges of the fingers as dark pixel areas, (2) providing rectangles circumscribing the prints, and (3) determining a position of the prints by using a center of mass, surface area and orientation of the rectangles for purposes of comparing first phalanges prints with reference presets, wherein the display unit displays the animated finger position images as real-time positive finger depictions that show the fingers as a back view seen by a person who placed the fingers on the capture surface of the capture unit for guidance of a user.

18. The method according to claim 15, wherein motion of a finger is only displayed if the positions of the center of mass of the determined fingerprints move more than 15 pixels within 750 ms.

* * * * *